US012099873B2

United States Patent
Grimshaw et al.

(10) Patent No.: US 12,099,873 B2
(45) Date of Patent: Sep. 24, 2024

(54) POWER AWARE SCHEDULING

(71) Applicant: LANCIUM LLC, Houston, TX (US)

(72) Inventors: Andrew Grimshaw, Houston, TX (US); Vanamala Venkataswamy, Houston, TX (US); Raymond E. Cline, Jr., Houston, TX (US); Michael T. McNamara, Houston, TX (US)

(73) Assignee: LANCIUM LLC, Houston, TX (US)

( * ) Notice: Subject to any disclaimer, the term of this patent is extended or adjusted under 35 U.S.C. 154(b) by 467 days.

(21) Appl. No.: 17/402,175

(22) Filed: Aug. 13, 2021

(65) Prior Publication Data

US 2022/0050714 A1 Feb. 17, 2022

Related U.S. Application Data

(60) Provisional application No. 63/065,930, filed on Aug. 14, 2020.

(51) Int. Cl.
*G06F 9/46* (2006.01)
*G06F 9/48* (2006.01)
(Continued)

(52) U.S. Cl.
CPC .......... *G06F 9/4893* (2013.01); *G06F 9/4856* (2013.01); *G06F 9/4887* (2013.01); *G06Q 10/06313* (2013.01); *G06Q 50/06* (2013.01)

(58) Field of Classification Search
CPC .... G06F 9/4893; G06F 9/4856; G06F 9/4887; G06Q 10/06313
See application file for complete search history.

(56) References Cited

U.S. PATENT DOCUMENTS

| 4,106,097 A | 8/1978 | Fox et al. |
| 4,245,319 A | 1/1981 | Hedges |

(Continued)

FOREIGN PATENT DOCUMENTS

| CN | 1806374 A | 7/2006 |
| CN | 101799681 A | 8/2010 |

(Continued)

OTHER PUBLICATIONS

European Patent Application No. 19878191.6, Extended European Search Report dated Jul. 4, 2022.

(Continued)

*Primary Examiner* — Gregory A Kessler
(74) *Attorney, Agent, or Firm* — Barnes & Thornburg LLP

(57) ABSTRACT

A method includes, by a scheduling controller, receiving from a user a request for an application to be executed by a computing system associated with a data center, wherein the application includes a plurality of tasks, and wherein the request includes an estimated execution time corresponding to an estimated amount of real-world time that the tasks will be actively running on the computing system to fully execute the application. The method includes receiving from the user a service level objective indicating a target percentage of a total amount of real-world time that the tasks will be actively running on the computing system and generating, in response to determining that the job can be completed according to the service level objective and the estimated execution time, a notification indicating acceptance of the job.

17 Claims, 11 Drawing Sheets

(51) Int. Cl.
*G06Q 10/0631* (2023.01)
*G06Q 50/06* (2012.01)

(56) References Cited

U.S. PATENT DOCUMENTS

| | | |
|---|---|---|
| 4,247,786 A | 1/1981 | Hedges |
| 4,371,779 A | 2/1983 | Maynard et al. |
| 4,551,812 A | 11/1985 | Gurr et al. |
| 5,142,672 A | 8/1992 | Johnson et al. |
| 5,367,669 A | 11/1994 | Holland et al. |
| 5,544,046 A | 8/1996 | Niwa |
| 5,761,083 A | 6/1998 | Brown, Jr. et al. |
| 5,913,046 A | 6/1999 | Barth et al. |
| 6,115,698 A | 9/2000 | Tuck et al. |
| 6,244,516 B1 | 6/2001 | Langervik et al. |
| 6,288,456 B1 | 9/2001 | Cratty |
| 6,437,692 B1 | 8/2002 | Petite et al. |
| 6,473,744 B1 | 10/2002 | Tuck et al. |
| 6,519,509 B1 | 2/2003 | Nierlich et al. |
| 6,618,709 B1 | 9/2003 | Sneeringer |
| 6,633,823 B2 | 10/2003 | Bartone et al. |
| 6,643,567 B2 | 11/2003 | Kolk et al. |
| 6,681,154 B2 | 1/2004 | Nierlich et al. |
| 6,745,105 B1 | 6/2004 | Fairlie et al. |
| 6,748,932 B1 | 6/2004 | Sorter et al. |
| 6,772,031 B1 * | 8/2004 | Strand ................... G06F 11/328 718/100 |
| 6,775,595 B1 | 8/2004 | Yabutani et al. |
| 6,785,592 B1 | 8/2004 | Smith et al. |
| 6,868,293 B1 | 3/2005 | Schurr et al. |
| 6,912,450 B2 | 6/2005 | Fairlie et al. |
| 7,010,363 B2 | 3/2006 | Donnelly et al. |
| 7,027,992 B2 | 4/2006 | Zaccaria et al. |
| 7,035,179 B2 | 4/2006 | Chen et al. |
| 7,053,767 B2 | 5/2006 | Petite et al. |
| 7,054,271 B2 | 5/2006 | Brownrigg et al. |
| 7,062,360 B2 | 6/2006 | Fairlie et al. |
| 7,076,339 B2 | 7/2006 | Yabutani et al. |
| 7,088,014 B2 | 8/2006 | Nierlich et al. |
| 7,127,328 B2 | 10/2006 | Ransom |
| 7,130,832 B2 | 10/2006 | Bannai et al. |
| 7,135,956 B2 | 11/2006 | Bartone et al. |
| 7,143,300 B2 | 11/2006 | Potter et al. |
| 7,149,605 B2 | 12/2006 | Chassin et al. |
| 7,181,316 B2 | 2/2007 | Fairlie et al. |
| 7,188,003 B2 | 3/2007 | Ransom et al. |
| 7,206,670 B2 | 4/2007 | Pimputkar et al. |
| 7,278,273 B1 | 10/2007 | Whitted et al. |
| 7,305,282 B2 | 12/2007 | Chen |
| 7,333,880 B2 | 2/2008 | Brewster et al. |
| 7,369,968 B2 | 5/2008 | Johnson et al. |
| 7,376,851 B2 | 5/2008 | Kim |
| 7,420,293 B2 | 9/2008 | Donnelly et al. |
| 7,460,930 B1 | 12/2008 | Howell et al. |
| 7,468,661 B2 | 12/2008 | Petite et al. |
| 7,519,453 B2 | 4/2009 | Fairlie et al. |
| 7,561,977 B2 | 7/2009 | Horst et al. |
| 7,565,224 B2 | 7/2009 | Fairlie et al. |
| 7,647,516 B2 | 1/2010 | Ranganathan et al. |
| 7,702,931 B2 | 4/2010 | Goodrum et al. |
| 7,779,276 B2 | 8/2010 | Bolan et al. |
| 7,783,907 B2 | 8/2010 | Dubinsky |
| 7,861,102 B1 | 12/2010 | Ranganathan et al. |
| 7,921,315 B2 | 4/2011 | Langgood et al. |
| 7,970,561 B2 | 6/2011 | Pfeiffer |
| 8,001,403 B2 | 8/2011 | Hamilton et al. |
| 8,006,108 B2 | 8/2011 | Brey et al. |
| 8,214,843 B2 | 7/2012 | Boss et al. |
| 8,260,913 B2 | 9/2012 | Knapp et al. |
| 8,327,123 B2 | 12/2012 | Juffa et al. |
| 8,374,928 B2 | 2/2013 | Gopisetty et al. |
| 8,447,993 B2 | 5/2013 | Greene et al. |
| 8,571,820 B2 | 10/2013 | Pfeiffer |
| 8,595,094 B1 | 11/2013 | Forbes, Jr. |
| 8,595,515 B1 | 11/2013 | Weber et al. |
| 8,601,287 B1 | 12/2013 | Weber et al. |
| 8,627,123 B2 | 1/2014 | Jain et al. |
| 8,639,392 B2 | 1/2014 | Chassin |
| 8,700,929 B1 | 4/2014 | Weber et al. |
| 8,706,914 B2 | 4/2014 | Duchesneau |
| 8,706,915 B2 | 4/2014 | Duchesneau |
| 8,719,223 B2 | 5/2014 | Knapp et al. |
| 8,789,061 B2 | 7/2014 | Pavel et al. |
| 8,799,690 B2 | 8/2014 | Dawson et al. |
| 8,839,551 B2 | 9/2014 | Swann |
| 9,003,211 B2 | 4/2015 | Pfeiffer |
| 9,003,216 B2 | 4/2015 | Sankar et al. |
| 9,026,814 B2 | 5/2015 | Aasheim et al. |
| 9,027,024 B2 | 5/2015 | Mick et al. |
| 9,143,392 B2 | 9/2015 | Duchesneau |
| 9,207,993 B2 | 12/2015 | Jain |
| 9,218,035 B2 | 12/2015 | Li et al. |
| 9,252,598 B2 | 2/2016 | Belady et al. |
| 9,282,022 B2 | 3/2016 | Matthews et al. |
| 9,416,904 B2 | 8/2016 | Belady et al. |
| 9,477,279 B1 | 10/2016 | Piszczek et al. |
| 9,542,231 B2 | 1/2017 | Khan et al. |
| 9,552,234 B2 | 1/2017 | Boldyrev et al. |
| 9,557,792 B1 | 1/2017 | Potlapally et al. |
| 9,618,991 B1 | 4/2017 | Clidaras et al. |
| 9,645,596 B1 | 5/2017 | Lee et al. |
| 9,800,052 B2 | 10/2017 | Li et al. |
| 9,890,905 B2 | 2/2018 | Plummer et al. |
| 9,915,927 B2 | 3/2018 | Kobayashi |
| 9,946,815 B1 | 4/2018 | Weber et al. |
| 9,994,118 B2 | 6/2018 | Williams et al. |
| 10,033,210 B2 | 7/2018 | Peterson et al. |
| 10,250,039 B2 | 4/2019 | Wenzel et al. |
| 10,334,758 B1 | 6/2019 | Ramirez et al. |
| 10,340,696 B2 | 7/2019 | Paine et al. |
| 10,360,077 B2 | 7/2019 | Mahindru et al. |
| 10,367,335 B2 | 7/2019 | Kawashima et al. |
| 10,367,353 B1 | 7/2019 | McNamara et al. |
| 10,367,535 B2 | 7/2019 | Corse et al. |
| 10,444,818 B1 | 10/2019 | McNamara et al. |
| 10,452,127 B1 | 10/2019 | McNamara et al. |
| 10,452,532 B2 | 10/2019 | McVay et al. |
| 10,497,072 B2 | 12/2019 | Hooshmand et al. |
| 10,545,560 B2 | 1/2020 | Mahindru et al. |
| 10,608,433 B1 | 3/2020 | McNamara et al. |
| 10,618,427 B1 | 4/2020 | McNamara et al. |
| 10,637,353 B2 | 4/2020 | Ohyama et al. |
| 10,709,076 B2 | 7/2020 | Pham |
| 10,795,428 B2 | 10/2020 | Walsh |
| 10,819,599 B2 | 10/2020 | Mahindru et al. |
| 10,822,992 B2 | 11/2020 | Spears |
| 10,838,482 B2 | 11/2020 | Mahindru et al. |
| 10,857,899 B1 | 12/2020 | McNamara et al. |
| 10,862,307 B2 | 12/2020 | Cavness et al. |
| 10,862,309 B2 | 12/2020 | Cavness et al. |
| 10,873,211 B2 | 12/2020 | McNamara et al. |
| 10,931,117 B2 | 2/2021 | Shoemaker |
| 11,009,909 B2 | 5/2021 | Kuwabara et al. |
| 11,016,456 B2 | 5/2021 | Henson et al. |
| 11,016,458 B2 | 5/2021 | McNamara et al. |
| 11,016,553 B2 | 5/2021 | McNamara et al. |
| 11,025,060 B2 | 6/2021 | McNamara et al. |
| 11,031,787 B2 | 6/2021 | McNamara et al. |
| 11,031,813 B2 | 6/2021 | McNamara et al. |
| 11,042,948 B1 | 6/2021 | McNamara et al. |
| 11,128,165 B2 | 9/2021 | McNamara et al. |
| 11,163,280 B2 | 11/2021 | Henson et al. |
| 11,169,592 B2 | 11/2021 | Mahindru et al. |
| 11,194,150 B2 | 12/2021 | Baba |
| 11,256,320 B2 | 2/2022 | McNamara et al. |
| 11,275,427 B2 | 3/2022 | McNamara et al. |
| 11,397,999 B2 | 7/2022 | McNamara et al. |
| 11,418,037 B2 | 8/2022 | Cavness et al. |
| 11,431,195 B2 | 8/2022 | McNamara et al. |
| 11,451,059 B2 | 9/2022 | Cavness et al. |
| 11,537,183 B2 | 12/2022 | Lewis et al. |
| 11,669,920 B2 | 6/2023 | McNamara et al. |
| 11,682,902 B2 | 6/2023 | McNamara et al. |
| 2002/0158749 A1 | 10/2002 | Ikeda et al. |

(56) References Cited

U.S. PATENT DOCUMENTS

| | | |
|---|---|---|
| 2002/0196124 A1 | 12/2002 | Howard et al. |
| 2003/0037150 A1 | 2/2003 | Nakagawa |
| 2003/0074464 A1 | 4/2003 | Bohrer et al. |
| 2003/0171851 A1 | 9/2003 | Brickfield et al. |
| 2004/0027004 A1 | 2/2004 | Bayoumi et al. |
| 2004/0117330 A1 | 6/2004 | Ehlers et al. |
| 2005/0005528 A1 | 1/2005 | Brault et al. |
| 2005/0034128 A1 | 2/2005 | Nagashima et al. |
| 2005/0102539 A1 | 5/2005 | Hepner et al. |
| 2005/0154499 A1 | 7/2005 | Aldridge et al. |
| 2005/0165512 A1 | 7/2005 | Peljto |
| 2005/0203761 A1 | 9/2005 | Barr et al. |
| 2006/0031180 A1 | 2/2006 | Tamarkin et al. |
| 2006/0059772 A1 | 3/2006 | Brault et al. |
| 2006/0161765 A1 | 7/2006 | Cromer et al. |
| 2006/0253675 A1 | 11/2006 | Johannes Bloks |
| 2007/0067657 A1 | 3/2007 | Ranganathan et al. |
| 2007/0228837 A1 | 10/2007 | Nielsen et al. |
| 2008/0000151 A1 | 1/2008 | Houweling et al. |
| 2008/0013596 A1 | 1/2008 | Dunne et al. |
| 2008/0030078 A1 | 2/2008 | Whitted et al. |
| 2008/0082844 A1 | 4/2008 | Ghiasi et al. |
| 2008/0094797 A1 | 4/2008 | Coglitore et al. |
| 2008/0238195 A1 | 10/2008 | Shaver et al. |
| 2009/0012523 A1 | 1/2009 | Ruuttu et al. |
| 2009/0055665 A1 | 2/2009 | Maglione et al. |
| 2009/0070611 A1 | 3/2009 | Bower, III et al. |
| 2009/0078401 A1 | 3/2009 | Cichanowicz |
| 2009/0089595 A1 | 4/2009 | Brey et al. |
| 2009/0144566 A1 | 6/2009 | Bletsch et al. |
| 2009/0216910 A1 | 8/2009 | Duchesneau |
| 2009/0235097 A1 | 9/2009 | Hamilton et al. |
| 2009/0254660 A1 | 10/2009 | Hanson et al. |
| 2010/0058350 A1 | 3/2010 | Boss et al. |
| 2010/0088261 A1 | 4/2010 | Montalvo |
| 2010/0211810 A1 | 8/2010 | Zacho |
| 2010/0235004 A1 | 9/2010 | Thind |
| 2010/0280675 A1 | 11/2010 | Tate, Jr. et al. |
| 2010/0313203 A1 | 12/2010 | Dawson et al. |
| 2010/0328849 A1 | 12/2010 | Ewing et al. |
| 2010/0333113 A1 | 12/2010 | Johnson et al. |
| 2011/0072289 A1 | 3/2011 | Kato |
| 2011/0115223 A1 | 5/2011 | Stahlkopf et al. |
| 2011/0239015 A1 | 9/2011 | Boyd et al. |
| 2011/0282527 A1 | 11/2011 | Inbarajan et al. |
| 2011/0282982 A1 | 11/2011 | Jain |
| 2011/0316337 A1 | 12/2011 | Pelio et al. |
| 2012/0000121 A1 | 1/2012 | Swann |
| 2012/0032665 A1 | 2/2012 | Shaver, II et al. |
| 2012/0072745 A1 | 3/2012 | Ahluwalia et al. |
| 2012/0078430 A1 | 3/2012 | Fan et al. |
| 2012/0109705 A1 | 5/2012 | Belady et al. |
| 2012/0150679 A1 | 6/2012 | Lazaris |
| 2012/0290865 A1 | 11/2012 | Kansal et al. |
| 2012/0300524 A1 | 11/2012 | Fornage et al. |
| 2012/0306271 A1 | 12/2012 | Kuriyama |
| 2012/0321309 A1 | 12/2012 | Barry et al. |
| 2012/0324245 A1 | 12/2012 | Sinha et al. |
| 2012/0326511 A1 | 12/2012 | Johnson |
| 2013/0006401 A1 | 1/2013 | Shan |
| 2013/0007515 A1 | 1/2013 | Shaw et al. |
| 2013/0054987 A1 | 2/2013 | Pfeiffer et al. |
| 2013/0063991 A1 | 3/2013 | Xiao et al. |
| 2013/0111494 A1 | 5/2013 | Hyser et al. |
| 2013/0117621 A1 | 5/2013 | Saraiya et al. |
| 2013/0187464 A1 | 7/2013 | Smith et al. |
| 2013/0213038 A1 | 8/2013 | Lazaris |
| 2013/0218356 A1 | 8/2013 | Lee et al. |
| 2013/0227139 A1 | 8/2013 | Suffling |
| 2013/0328395 A1 | 12/2013 | Krizman et al. |
| 2014/0020292 A1 | 1/2014 | McNamara et al.. |
| 2014/0070756 A1 | 3/2014 | Kearns et al. |
| 2014/0075222 A1 | 3/2014 | Jackson |
| 2014/0114829 A1 | 4/2014 | Forbes, Jr. |
| 2014/0137468 A1 | 5/2014 | Ching |
| 2014/0149761 A1 | 5/2014 | Allen-Ware et al. |
| 2014/0150336 A1 | 6/2014 | Houweling |
| 2014/0180886 A1 | 6/2014 | Forbes, Jr. |
| 2014/0222225 A1 | 8/2014 | Rouse et al. |
| 2014/0365402 A1 | 12/2014 | Belady et al. |
| 2014/0365795 A1 | 12/2014 | Nielsen et al. |
| 2014/0379156 A1 | 12/2014 | Kamel et al. |
| 2015/0006940 A1 | 1/2015 | Kim et al. |
| 2015/0012113 A1 | 1/2015 | Celebi |
| 2015/0058845 A1 | 2/2015 | Song et al. |
| 2015/0106811 A1 | 4/2015 | Holler et al. |
| 2015/0121113 A1 | 4/2015 | Ramamurthy et al. |
| 2015/0155712 A1 | 6/2015 | Mondal |
| 2015/0212122 A1 | 7/2015 | Sobotka et al. |
| 2015/0229227 A1 | 8/2015 | Aeloiza et al. |
| 2015/0277410 A1 | 10/2015 | Gupta et al. |
| 2015/0278968 A1 | 10/2015 | Steven et al. |
| 2015/0278969 A1 | 10/2015 | Benoy et al. |
| 2015/0280492 A1 | 10/2015 | Narita |
| 2015/0288183 A1 | 10/2015 | Villanueva, Jr. et al. |
| 2015/0363132 A1 | 12/2015 | Uehara |
| 2015/0371328 A1 | 12/2015 | Gabel et al. |
| 2015/0372538 A1 | 12/2015 | Siegler et al. |
| 2016/0006066 A1 | 1/2016 | Robertson |
| 2016/0011617 A1 | 1/2016 | Liu et al. |
| 2016/0013652 A1 | 1/2016 | Li et al. |
| 2016/0043552 A1 | 2/2016 | Villanueva, Jr. et al. |
| 2016/0054774 A1 | 2/2016 | Song et al. |
| 2016/0087909 A1 | 3/2016 | Chatterjee et al. |
| 2016/0091948 A1 | 3/2016 | Mitchell et al. |
| 2016/0109916 A1 | 4/2016 | Li et al. |
| 2016/0126783 A1 | 5/2016 | Cheng et al. |
| 2016/0170469 A1 | 6/2016 | Sehgal et al. |
| 2016/0172900 A1 | 6/2016 | Welch, Jr. |
| 2016/0187906 A1 | 6/2016 | Bodas et al. |
| 2016/0198656 A1 | 7/2016 | McNamara et al. |
| 2016/0202744 A1 | 7/2016 | Castro-Leon |
| 2016/0212954 A1 | 7/2016 | Argento |
| 2016/0248631 A1 | 8/2016 | Duchesneau |
| 2016/0261226 A1 | 9/2016 | Hamilton et al. |
| 2016/0324077 A1 | 11/2016 | Frantzen et al. |
| 2016/0329708 A1 | 11/2016 | Day |
| 2016/0377306 A1 | 12/2016 | Drees et al. |
| 2017/0023969 A1 | 1/2017 | Shows et al. |
| 2017/0104336 A1 | 4/2017 | Elbsat et al. |
| 2017/0104337 A1 | 4/2017 | Drees |
| 2017/0104342 A1 | 4/2017 | Eibsat et al. |
| 2017/0104343 A1 | 4/2017 | Eibsat et al. |
| 2017/0185132 A1 | 6/2017 | Bodas et al. |
| 2017/0192483 A1 | 7/2017 | Boss et al. |
| 2017/0194791 A1 | 7/2017 | Budde |
| 2017/0201098 A1 | 7/2017 | Carpenter |
| 2017/0214070 A1 | 7/2017 | Wang et al. |
| 2017/0237261 A1 | 8/2017 | Maug et al. |
| 2017/0261949 A1 | 9/2017 | Hoffmann et al. |
| 2017/0300359 A1 | 10/2017 | Kollur et al. |
| 2017/0366412 A1 | 12/2017 | Piga |
| 2017/0373500 A1 | 12/2017 | Shafi et al. |
| 2018/0026478 A1 | 1/2018 | Peloso |
| 2018/0052431 A1 | 2/2018 | Shaikh et al. |
| 2018/0101220 A1 | 4/2018 | Mahindru et al. |
| 2018/0105051 A1 | 4/2018 | Zheng et al. |
| 2018/0116070 A1 | 4/2018 | Broadbent et al. |
| 2018/0144414 A1 | 5/2018 | Lee et al. |
| 2018/0166881 A1 | 6/2018 | Suryanarayana et al. |
| 2018/0175666 A1 | 6/2018 | Ayer et al. |
| 2018/0202825 A1 | 7/2018 | You et al. |
| 2018/0240112 A1 | 8/2018 | Castinado et al. |
| 2018/0267839 A1 | 9/2018 | Maisuria et al. |
| 2018/0294649 A1 | 10/2018 | Bright et al. |
| 2018/0356770 A1 | 12/2018 | Eibsat et al. |
| 2018/0366978 A1 | 12/2018 | Matan et al. |
| 2018/0367320 A1 | 12/2018 | Montalvo |
| 2019/0052094 A1 | 2/2019 | Pmsvvsv et al. |
| 2019/0082618 A1 | 3/2019 | Lopez |
| 2019/0168630 A1 | 6/2019 | Mrlik et al. |
| 2019/0173283 A1 | 6/2019 | Epel et al. |
| 2019/0258307 A1 | 8/2019 | Shaikh et al. |
| 2019/0280521 A1 | 9/2019 | Lundstrom et al. |

(56) References Cited

U.S. PATENT DOCUMENTS

| | | |
|---|---|---|
| 2019/0318327 A1 | 10/2019 | Sowell et al. |
| 2019/0324820 A1 | 10/2019 | Krishnan et al. |
| 2019/0339756 A1 | 11/2019 | Lewis et al. |
| 2020/0019230 A1 | 1/2020 | Rong et al. |
| 2020/0051184 A1 | 2/2020 | Barbour |
| 2020/0136387 A1 | 4/2020 | McNamara et al. |
| 2020/0136388 A1 | 4/2020 | McNamara et al. |
| 2020/0167197 A1 | 5/2020 | Bahramshahry et al. |
| 2020/0177100 A1 | 6/2020 | Wang et al. |
| 2020/0318843 A1 | 10/2020 | Wenzel et al. |
| 2020/0321776 A1 | 10/2020 | Shaver, II et al. |
| 2020/0379537 A1 | 12/2020 | Henson et al. |
| 2021/0021135 A1 | 1/2021 | Eibsat et al. |
| 2021/0036547 A1 | 2/2021 | McNamara et al. |
| 2021/0101499 A1 | 4/2021 | McNamara et al. |
| 2021/0126456 A1 | 4/2021 | McNamara et al. |
| 2021/0175710 A1 | 6/2021 | Campbell et al. |
| 2021/0287309 A1 | 9/2021 | Gebhardt et al. |
| 2021/0294405 A1 | 9/2021 | McNamara et al. |
| 2021/0296893 A1 | 9/2021 | McNamara et al. |
| 2021/0296928 A1 | 9/2021 | McNamara et al. |
| 2021/0298195 A1 | 9/2021 | Barbour |
| 2022/0033517 A1 | 2/2022 | Hendry et al. |
| 2022/0039333 A1 | 2/2022 | Avila |
| 2022/0197363 A1 | 6/2022 | McNamara et al. |
| 2022/0294219 A1 | 9/2022 | McNamara et al. |
| 2022/0366517 A1 | 11/2022 | McNamara et al. |
| 2022/0407350 A1 | 12/2022 | McNamara et al. |
| 2023/0208138 A1 | 6/2023 | McNamara et al. |
| 2023/0275432 A1 | 8/2023 | McNamara et al. |

FOREIGN PATENT DOCUMENTS

| | | |
|---|---|---|
| CN | 101803148 A | 8/2010 |
| CN | 101895150 A | 11/2010 |
| CN | 102185382 A | 9/2011 |
| CN | 102591921 A | 7/2012 |
| CN | 103163904 A | 6/2013 |
| CN | 103440028 A | 12/2013 |
| CN | 103748757 A | 4/2014 |
| CN | 104144183 A | 11/2014 |
| CN | 104508932 A | 4/2015 |
| CN | 204243874 U | 4/2015 |
| CN | 104715340 A | 6/2015 |
| CN | 104731294 A | 6/2015 |
| CN | 104969434 A | 10/2015 |
| CN | 105406580 A | 3/2016 |
| CN | 106226718 A | 12/2016 |
| CN | 106464523 A | 2/2017 |
| CN | 106716299 A | 5/2017 |
| CN | 107967536 A | 4/2018 |
| EP | 3850462 A1 | 7/2021 |
| EP | 3850465 A4 | 6/2022 |
| JP | 2011123873 A | 6/2011 |
| JP | 2013524317 A | 6/2013 |
| JP | 2017530449 A | 10/2017 |
| KR | 20090012523 A | 2/2009 |
| WO | WO-2008039773 A2 | 4/2008 |
| WO | WO-2010050249 A1 | 5/2010 |
| WO | WO-2014005156 A2 | 1/2014 |
| WO | WO-2015039122 A1 | 3/2015 |
| WO | WO-2015199629 A1 | 12/2015 |
| WO | WO-2017163126 A1 | 9/2017 |
| WO | WO-2018068042 A1 | 4/2018 |
| WO | WO-2019060180 A2 | 3/2019 |
| WO | WO-2019116375 A1 | 6/2019 |
| WO | WO-2019139632 A1 | 7/2019 |
| WO | WO-2019139633 A1 | 7/2019 |
| WO | WO-2020056308 A1 | 3/2020 |
| WO | WO-2020056319 A1 | 3/2020 |
| WO | WO-2020056322 A1 | 3/2020 |
| WO | WO-2020227811 A1 | 11/2020 |
| WO | WO-2022031836 A1 | 2/2022 |

OTHER PUBLICATIONS

European Patent Application No. 18900411.2, Extended European Search Report dated Dec. 13, 2021.
European Patent Application No. 19858739.6, Extended European Search Report dated May 31, 2022.
European Patent Application No. 19858812.1, Extended European Search Report dated May 2, 2022.
European Patent Application No. 19861222.8, Extended European Search Report dated May 2, 2022.
European Patent Application No. 19861223.6, Extended European Search Report dated Apr. 19, 2022.
European Patent Application No. 19877576.9, Extended European Search Report dated Jun. 3, 2022.
Final Office Action mailed Jan. 6, 2022 on for U.S. Appl. No. 16/529,360, filed Aug. 1, 2019, 40 pages.
Ghamkhari et al., "Energy and Performance Management of Green Data Centers: A Profit Maximization Approach," IEEE Transactions on Smart Grid, Jun. 2013, vol. 4 (2), pp. 1017-1025.
Huang et al., "Data Center Energy Cost Optimization in Smart Grid: a Review," Journal of Zhejiang University (Engineering Science), 2016, vol. 50 (12), pp. 2386-2399.
Kiani et al., "Profit Maximization for Geographical Dispersed Green Data Centers," Arxiv.org, Cornell University Library, 201 Olin Library Cornell University Ithaca, Apr. 2015, pp. 1-5.
Li et al., "iSwitch: Coordinating and Optimizing Renewable Energy Powered Server Clusters," 2012 39th Annual International Symposium on Computer Architecture, Jun. 2012, pp. 512-523.
Non-Final Office Action mailed Dec. 24, 2021 on for U.S. Appl. No. 17/128,830, filed Dec. 21, 2020, 4 pages.
Notice of Allowance mailed May 31, 2022 on for U.S. Appl. No. 16/529,402, filed Aug. 1, 2019 13 pages.
Notice of Allowance mailed on Feb. 2, 2022, for U.S. Appl. No. 16/525,142, filed Jul. 29, 2019, 5 pages.
Notice of Allowance mailed on Feb. 3, 2022, for U.S. Appl. No. 16/573,577, filed Sep. 17, 2019, 8 pages.
Notice of Allowance mailed on Jan. 5, 2022, for U.S. Appl. No. 16/658,983, filed Oct. 21, 2019, 14 pages.
Notice of Allowance mailed on Apr. 18, 2022, for U.S. Appl. No. 17/128,830, filed Dec. 21, 2020, 7 pages.
Notice of Allowance mailed on Jan. 24, 2022, for U.S. Appl. No. 16/525,142, filed Jul. 29, 2019, 9 pages.
Notice of Allowance mailed on Jan. 26, 2022, for U.S. Appl. No. 17/328,275, filed May 24, 2021, 10 pages.
Wang et al., "SHIP: Scalable Hierarchical Power Control for Large-scale Data Centers," 2009 18th International Conference onParallel Architectures and Compilation Techniques, Sep. 2009, pp. 91-100.
Wierman et al., "Opportunities and Challenges for Data Center Demand Response," International Green Computing Conference,IEEE, Nov. 2014, pp. 1-10.
Advisory Action mailed on Nov. 13, 2020 for U.S. Appl. No. 16/529,360, filed Aug. 1, 2019, 182 pages.
Advisory Action mailed on Oct. 22, 2020 for U.S. Appl. No. 16/528,348, filed Jul. 31, 2019, 3 pages.
Bakar et al., "Microgrid and Load Shedding Scheme During Islanded Mode: a Review," Elsevier, May 26, 2020, vol. 71, pp. 161-169. https://www.sciencedirect.com/science/article/pii/S1364032116311030.
Bird et al., "Wind and Solar Energy Curtailment: Experience and Practices in the United States," National Renewable Energy Lab (NREL), Technical Report NREL/TP-6A20-60983, Mar. 2014, 58 pages.
Choi et al., "Optimal Load Shedding for Maximizing Satisfaction in an Islanded Microgrid," Energies, 2017, vol. 10, pp. 45. doi: 10.3390/en10010045.
EPEX Spot, "How They Occur, What They Mean," 2018, 2 pages. Retrieved from Internet:[URL:https://www.epexspot.com/en/company-info/basics_of_the_power_market/negative_prices].
European Patent Application No. EP18900411.2, Partial Supplementary European Search Report dated Sep. 9, 2021.
Final Office Action mailed Jul. 23, 2020 on for U.S. Appl. No. 16/132,062, filed Sep. 14, 2018, 26 pages.

(56) References Cited

OTHER PUBLICATIONS

Final Office Action mailed on May 19, 2020 for U.S. Appl. No. 16/809,111, filed Mar. 4, 2020, 36 pages.
Final Office Action mailed on Jun. 3, 2020 for U.S. Appl. No. 16/528,348, filed Jul. 31, 2019, 33 pages.
Final Office Action mailed on May 28, 2020 for U.S. Appl. No. 16/132,098, filed Sep. 14, 2018, 24 pages.
Final Office Action mailed Aug. 9, 2021 on for U.S. Appl. No. 16/529,402, filed Aug. 1, 2019, 43 pages.
Final Office Action mailed Aug. 9, 2021 on for U.S. Appl. No. 16/573,577, filed Sep. 17, 2019, 16 pages.
Final Office Action mailed Jul. 9, 2021 on for U.S. Appl. No. 16/525,142, filed Jul. 29, 2019, 18 pages.
Final Office Action mailed on Oct. 1, 2019 for U.S. Appl. No. 16/175,246, filed Oct. 30, 2018, 18 pages.
Final Office Action mailed on Apr. 17, 2020 for U.S. Appl. No. 16/529,402, filed Aug. 1, 2019, 59 pages.
Final Office Action mailed on Jul. 29, 2020 for U.S. Appl. No. 16/132,092, filed Sep. 14, 2018, 5 pages.
Gao et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.
Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.
Ghatikar et al., "Demand Response Opportunities and Enabling Technologies for DataCenters: Findings from Field Studies," Lawrence Berkeley National Laboratory, Aug. 2012, 57 pages.
Hayes, Adam S., "A Cost of Production Model for Bitcoin," Department of Economics, The New School for Social Research, Mar. 2015, 5 pages.
International Search Report and Written Opinion of PCT Application No. PCT/US2018/017955, mailed on Apr. 30, 2018, 22 pages. <iframe class="ginger-extension-definitionpopup" src="chrome-extension://kdfieneakcjfaiglcfcgkidlkmlijnh/content/popups/definitionPopup/index.html?title=filed&description=record%20in%20a%20public%20office%20or%20in%20a%20court%20of%20law" style="left: 396px; top: -116px; z-index: 100001; display: none;"></iframe>.
International Search Report and Written Opinion of PCT Application No. PCT/US2018/017950, mailed on May 31, 2018, 15 pages.
International Search Report and Written Opinion of PCT Application No. PCT/US2020/044536, mailed on Aug. 26, 2020, 24 pages.
International Search Report and Written Opinion of PCT Application No. PCT/US2020/044539, mailed on Aug. 26, 2020, 7 pages.
International Search Report and Written Opinion of PCT Application No. PCT/US2021/019875, mailed on Apr. 29, 2021, 12 pages.
International Search Report and Written Opinion of PCT Application No. PCT/US2021/045972, mailed on Nov. 15, 2021, 16 pages.
International Search Report and Written Opinion of PCT Application No. PCT/US20/57686, mailed on Feb. 22, 2021, 67 pages.
ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet: <url: <a="" href="https://www.nyiso.com/documents/20142/1391862/Distributed_Energy_Resources_Roadmap.pdf/ec0b3b64-4de2-73e0-ffef-49a4b8b1">https://www.nyiso.com/documents/20142/1391862/Distributed_Energy_Resources_Roadmap.pdf/ec0b3b64-4de2-73e0-ffef-49a4b8b1 b3ca.</url:>.
John, "Stem and CPower to Combine Behind-the-Meter Batteries and Demand Response," Energy Storage, Aug. 8, 2017, 1 pages.
Kewl, "Start-Up From the Heart of Berlin Has Pioneered Decentralized Mobile Mining by Combining Blockchain With Regenerative Energy" Nov. 13, 2017, 3 pages. Retrieved from Internet:[URL:www.crypto-news.net/start-up-from-the-heart-of-berlin-has-pioneered-decentralized-mobile-mining-by-combining-blockchain-with-regenerative-energy/].
Lim et al., "Distributed Load-shedding System for Agent-based Autonomous Microgrid Operations," Energies, 2014, vol. 7(1), pp. 385-401. doi: 10.3390/en7010385.
Liu et al., "Improved Average Consensus Algorithm Based Distributed Cost Optimization for Loading Shedding of Autonomous Microgrids," International Journal of Electrical Power & Energy Systems, Dec. 2015, vol. 73, pp. 89-96. doi: 10.1016/j.ijepes.2015.04.006.
McNamara et al., U.S. Appl. No. 16/175,246, mailed on Oct. 30, 2018, 64 pages.
Mousavizadeh et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.
Non-Final Office Action mailed on Dec. 5, 2019 for U.S. Appl. No. 16/529,360, filed Aug. 1, 2019, 72 pages.
Non-Final Office Action mailed on Dec. 10, 2019 for U.S. Appl. No. 16/596,190, filed Oct. 8, 2019, 72 pages.
Non-Final Office Action mailed on Jun. 12, 2020 for U.S. Appl. No. 16/803,109, filed Dec. 27, 2020, 31 pages.
Non-Final Office Action mailed on Nov. 14, 2019 for U.S. Appl. No. 16/132,098, filed Sep. 14, 2018, 25 pages.
Non-Final Office Action mailed on Feb. 20, 2020 for U.S. Appl. No. 16/702,894, filed Dec. 4, 2019, 30 pages.
Non-Final Office Action mailed on Nov. 21, 2019 for U.S. Appl. No. 16/529,402, filed Aug. 1, 2019, 57 pages.
Non-Final Office Action mailed Feb. 4, 2021 on for U.S. Appl. No. 16/284,610, filed Feb. 25, 2019, 9 pages.
Non-Final Office Action mailed Apr. 1, 2021 on for U.S. Appl. No. 16/482,495, filed Jul. 31, 2019, 59 pages.
Non-Final Office Action mailed Apr. 2, 2020 on for U.S. Appl. No. 16/132,011, filed Sep. 14, 2018, 5 pages.
Non-Final Office Action mailed Mar. 8, 2021 on for U.S. Appl. No. 16/525,142, filed Jul. 29, 2019, 71 pages.
Non-Final Office Action mailed Dec. 11, 2019 on for U.S. Appl. No. 16/132,062, filed Sep. 14, 2018, 17 pages.
Non-Final Office Action mailed Feb. 12, 2021 on for U.S. Appl. No. 16/528,348, filed Jul. 31, 2019, 54 pages.
Non-Final Office Action mailed May 14, 2020 on for U.S. Appl. No. 16/834,987, filed Mar. 30, 2020, 30 pages.
Non-Final Office Action mailed Mar. 25, 2021 on for U.S. Appl. No. 16/573,577, filed Sep. 17, 2019, 65 pages.
Non-Final Office Action mailed on Dec. 10, 2019 for U.S. Appl. No. 16/528,348, filed Jul. 31, 2019, 33 pages.
Non-Final Office Action mailed on May 11, 2021 for U.S. Appl. No. 16/529,360, filed Aug. 1, 2019, 64 pages.
Non-Final Office Action mailed on May 28, 2021 for U.S. Appl. No. 16/658,983, filed Oct. 21, 2019, 21 pages.
Non-Final Office Action mailed on Mar. 30, 2020 for U.S. Appl. No. 16/132,092, filed Sep. 14, 2018, 46 pages.
Notice of Allowance mailed May 12, 2021 on for U.S. Appl. No. 16/132,062, filed Sep. 14, 2018, 2 pages.
Notice of Allowance mailed Oct. 13, 2020 on for U.S. Appl. No. 16/132,098, filed Sep. 14, 2018, 5 pages.
Notice of Allowance mailed Jun. 12, 2020 on for U.S. Appl. No. 16/834,987, filed Mar. 30, 2020, 9 pages.
Notice of Allowance mailed on Jun. 9, 2021 for U.S. Appl. No. 16/528,348, filed Jul. 31, 2019, 11 pages.
Notice of Allowance mailed Feb. 8, 2021 on for U.S. Appl. No. 16/132,062, filed Sep. 14, 2018, 21 pages.
Notice of Allowance mailed Feb. 8, 2021 on for U.S. Appl. No. 16/803,109, filed Feb. 27, 2020, 29 pages.
Notice of Allowance mailed Feb. 8, 2021 on for U.S. Appl. No. 16/834,987, filed Mar. 30, 2020, 180 pages.
Notice of Allowance mailed Jan. 13, 2021 on for U.S. Appl. No. 16/175,246, filed Oct. 30, 2018, 5 pages.
Notice of Allowance mailed Sep. 17, 2020 on for U.S. Appl. No. 16/175,246, filed Oct. 30, 2018, 5 pages.
Notice of Allowance mailed Nov. 19, 2020 on for U.S. Appl. No. 16/132,062, filed Sep. 14, 2018, 7 pages.
Notice of Allowance mailed Apr. 20, 2021 on for U.S. Appl. No. 16/482,495, filed Jul. 31, 2019, 5 pages.

(56) References Cited

OTHER PUBLICATIONS

Notice of Allowance mailed Jan. 25, 2021 on for U.S. Appl. No. 16/132,098, filed Sep. 14, 2018, 5 pages.
Notice of Allowance mailed Jan. 25, 2021 on for U.S. Appl. No. 16/702,894, filed Dec. 4, 2019, 24 pages.
Notice of Allowance mailed Jul. 26, 2021 on for U.S. Appl. No. 16/284,610, filed Feb. 25, 2019, 2 pages.
Notice of Allowance mailed Jan. 27, 2021 on for U.S. Appl. No. 16/132,092, filed Sep. 14, 2018, 8 pages.
Notice of Allowance mailed May 27, 2021 on for U.S. Appl. No. 16/284,610, filed Feb. 25, 2019, 16 pages.
Notice of Allowance mailed Jul. 29, 2020 on for U.S. Appl. No. 16/132,011, filed Sep. 14, 2018, 5 pages.
Notice of Allowance mailed Oct. 29, 2020 on for U.S. Appl. No. 16/132,092, filed Sep. 14, 2018, 8 pages.
Notice of Allowance mailed Oct. 8, 2021 on for U.S. Appl. No. 16/528,348, filed Jul. 31, 2019, 3 pages.
Notice of Allowance mailed on Apr. 2, 2019, for U.S. Appl. No. 16/175,335, filed Oct. 30, 2018, 12 pages.
Notice of Allowance mailed on Mar. 2, 2020, for U.S. Appl. No. 16/596,190, filed Oct. 8, 2019, 15 pages.
Notice of Allowance mailed on Apr. 6, 2020, for U.S. Appl. No. 16/175,246, filed Oct. 30, 2018, 12 pages.
Notice of Allowance mailed on Aug. 15, 2019, for U.S. Appl. No. 16/175,146, filed Oct. 30, 2018, 17 pages.
Notice of Allowance mailed on Sep. 24, 2021 for U.S. Appl. No. 16/528,348, filed Jul. 31, 2019, 06 pages.
Notice of Allowance mailed on Jan. 27, 2020, for U.S. Appl. No. 16/702,931, filed Dec. 4, 2019, 23 pages.
Notice of Allowance mailed on Jul. 29, 2019, for U.S. Appl. No. 16/245,532, filed Jan. 11, 2019, 13 pages.
Pashajavid et al., "A Multimode Supervisory Control Scheme for Coupling Remote Droop-Regulated Microgrids," IEEE Transactions on Smart Grid, May 26, 2020, vol. 9(5), pp. 5381-5392. https://ieeexplore.ieee.org/abstract/document/7888570/.
Pashajavid et al., "Frequency Support for Remote Microgrid Systems With Intermittent Distributed Energy Resources—A Two-level Hierarchical Strategy," IEEE Systems Journal, May 26, 2020, vol. 12(3), pp. 2760-2771. https://ieeexplore.ieee.org/abstract/document/7862156/.
Rahimi, Farrokh, "Using a Transactive Energy Framework," IEEE Electrification Magazine, Dec. 2016, pp. 23-29.
Rudez and Mihalic, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Soluna., "Powering the Block Chain," Aug. 2018, version 1.1, 29 pages.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Zhou et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
Abhyankar et al., "Using PETSc to Develop Scalable Applications for Next-Generation Power Grid," High Performance Computing, Networking and Analytics for the Power Grid, Nov. 2011 pp. 67-74 https://doi.org/10.1145/2096123.2096138.
Chen et al., "Power Trading Model for Distributed Power Generation Systems Based on Consortium Blockchains," Proceedings of the 12th Asia-Pacific Symposium on Internetware, Jul. 2021, pp. 91-98. https://doi.org/10.1145/3457913.3457929.
ERCOT, Business Procedures, Load Resource Qualification, Initial Qualification and Periodic Testing, Controllable Load Qualification Test Procedure for Ancillary Services (Jun. 1, 2014).
ERCOT, Business Procedures, Load Resource Qualification, Non-Controllable Load Resource Qualification and Testing Procedure, V1.1 (Apr. 1, 2011).
ERCOT, Controllable Load Resource (CLR) Participation in the ERCOT Market (Dec. 20, 2007).
ERCOT, Emergency Response Service Technical Requirements & Scope of Work, Oct. 1, 2018 through Jan. 31, 2019.
ERCOT, ERS QSE Training 101, Updated Apr. 6, 2022.
ERCOT, Large Flexible Load Resource Participation in the ERCOT Region, presentation to Large Flexible Load Task Force (Apr. 26, 2022).
ERCOT, Load Resource Participation in the ERCOT Region, presentation (Sep. 27, 2022).
ERCOT, Nodal Protocols (Oct. 18, 2019)—Applicant particularly notes the following pp. 2-4, 2-5, 2-15, 2-17, 2-24 to 26, 2-28, 2-29, 2-38, 2-41, 2-51, 2-52, 2-58, 2-62 to 63, 2-67, 2-69, 3-77 to 80, 3-176 to 3-186, 3-208 to 213, 3-214 to 216, 4-1 to 4, 4-10, 4-20, 4-25 to 27, 4-59 to 62, 4-64 to 67, 6-100 to 116, 8-1 to 58.
European Patent Application No. 20738289.6, Extended European Search Report dated Aug. 8, 2022.
European Patent Application No. 22157111.0, Extended European Search Report dated Aug. 17, 2022.
Examination Report mailed Jan. 17, 2023 for EP Application No. EP19858812.1 filed on Mar. 25, 2021.
Examination Report mailed Dec. 9, 2022 for EP Application No. EP2019086122.3 filed on Sep. 13, 2019.
Final Office Action mailed on Dec. 1, 2022 for U.S. Appl. No. 17/101,784, filed Mar. 16, 2013, 14 pages.
Final Office Action mailed on Jan. 20, 2023 for U.S. Appl. No. 17/331,440, filed May 26, 2021, 17 pages.
Hung et al., "Application of Improved Differential Evolution Algorithm for Economic and Emission Dispatch of Thermal Power Generation Plants," Proceedings of the 3rd International Conference on Machine Learning and Soft Computing, Jan. 2019, pp. 93-98. https://doi.org/10.1145/3310986.3311003.
Kim et al., "Automated di/dt Stressmark Generation for Microprocessor Power Delivery Networks," IEEE/ACM International Symposium on Low Power Electronics and Design, Aug. 2011, pp. 253-258.
Ko., "Ultra-Low Power Challenges for the next Generation ASIC," International Symposium on Low Power Electronics and Design, Jul. 2012, pp. 365-366. https://doi.org/10.1145/2333660.2333743.
Li et al., "Research on Evaluation Method of Integrated Energy Service Level of Power Generation Enterprises," Informatics, Environment, Energy and Applications, Jun. 2021, pp. 57-62. https://doi.org/10.1145/3458359.3458372.
Lin et al., "Automated Classification of Power Plants by Generation Type," E-Energy '20: Proceedings of the Eleventh ACM International Conference on Future Energy Systems, Jun. 2020, pp. 86-96. https://doi.org/10.1145/3396851.3397708.
Marcano et al., "Soil Power?: Can Microbial Fuel Cells Power Non-Trivial Sensors?," LP-IoT'21, Proceedings of the 1st ACM Workshop on No Power and Low Power Internet-of-Things, Jan. 2022, pp. 8-13. https://doi.org/10.1145/3477085.3478989.
Miyazaki et al., "Electric-Energy Generation Using Variable-Capacitive Resonator for Power-Free LSI: Efficiency Analysis and Fundamental Experiment," International Symposium on Low Power Electronics and Design, Aug. 2003, pp. 193-198, Doi: 10.1109/LPE.2003.1231861.
Nawaz et al., "Assisting the Power Generation Sector Toward Sustainability—an Lot Based System for Power Theft Detection With Theft Location Identification," Proceedings of the 2nd International Conference on Computing Advancements, Aug. 2022, pp. 309-315, https://doi.org/10.1145/3542954.3542999.
Non-Final Office Action mailed Oct. 6, 2022 on for U.S. Appl. No. 17/331,440, filed May 26, 2021, 4 pages.
Non-Final Office Action mailed Nov. 7, 2022 on for U.S. Appl. No. 17/692,636, filed Mar. 11, 2022, 9 pages.
Non-Final Office Action mailed Dec. 8, 2022 for U.S. Appl. No. 17/340,643, filed Jun. 7, 2021, 5 pages.

(56) References Cited

OTHER PUBLICATIONS

Non-Final Office Action mailed Sep. 22, 2022 on for U.S. Appl. No. 16/961,386, filed Jul. 10, 2020, 52 pages.
Non-Final Office Action mailed Aug. 25, 2022 on for U.S. Appl. No. 16/529,360, filed Aug. 1, 2019, 91 pages.
Non-Final Office Action mailed Sep. 29, 2022 on for U.S. Appl. No. 17/353,285, filed Jun. 21, 2021, 16 pages.
Non-Final Office Action mailed on Dec. 20, 2022, for U.S. Appl. No. 17/513,558, filed Oct. 28, 2021, 16 pages.
Notice of Allowance mailed Dec. 2, 2022 for U.S. Appl. No. 17/328,337, filed May 24, 2021, 5 pages.
Notice of Allowance mailed Dec. 2, 2022 on for U.S. Appl. No. 17/673,318, filed Feb. 16, 2022, 17 pages.
Notice of Allowance mailed Nov. 2, 2022 on for U.S. Appl. No. 17/340,886, filed Jun. 7, 2021, 9 pages.
Notice of Allowance mailed Aug. 10, 2022 on for U.S. Appl. No. 17/328,337, filed May 24, 2021, 9 pages.
Notice of Allowance mailed Nov. 23, 2022 on for U.S. Appl. No. 17/340,664, filed Jun. 7, 2021, 2 pages.
Notice of Allowance mailed on Aug. 3, 2022, for U.S. Appl. No. 17/340,886, filed Jun. 7, 2021, 09 pages.
Notice of Allowance mailed on Nov. 9, 2022, for U.S. Appl. No. 17/340,664, filed Dec. 16, 2013, 4 pages.
Notice of Allowance mailed on Jan. 13, 2023, for U.S. Appl. No. 16/961,386, filed Jul. 10, 2020, 13 pages.
Sakurai., "Next-Generation Power-Aware Design," ISLPED, Aug. 2008, pp. 383-384.
Sankaragomathi et al., "Optimal Power and Noise for Analog and Digital Sections of a Low Power Radio Receiver," International Symposium on Low Power Electronics & Design, Aug. 2008, pp. 271-276. https://doi.org/10.1145/1393921.1393993.
Sethuraman et al., "Multicasting Based Topology Generation and Core Mapping for a Power Efficient Networks-On-Chip," International Symposium on Low Power Electronics & Design, Aug. 2007, pp. 399-402. https://doi.org/10.1145/1283780.1283868.
Sharma et al., "Microgrids: A New Approach To Supply-Side Design For Data Centers," 2009, 7 pages.
Singh et al., "Targeted Random Test Generation for Power-Aware Multicore Designs," ACM Transactions on Design Automation of Electronic Systems, Jun. 2012, vol. 17(3), pp. 1-19. https://doi.org/10.1145/2209291.2209298.
Tao et al., "Simulation Model of Photo-Voltaic Grid-Connected Power Generation," Artificial Intelligence and Advanced Manufacture, Mar. 2022, pp. 2921-2926. https://doi.org/10.1145/3495018.3501208.
U.S. Appl. No. 62/556,880, filed Sep. 11, 2017, 8 pages.
Villani et al., "RF Power Transmission: Energy Harvesting for Self-Sustaining Miniaturized Sensor Nodes," Embedded Networked Sensor Systems, Sensys, Nov. 2021, pp. 592-593. https://doi.org/10.1145/3485730.3493365.
Yang et al., "Investment Value Analysis of Household Rooftop PV Power Generation Project under Carbon Trading Mode," Information Management and Management Science, Aug. 2019, pp. 160-165. https://doi.org/10.1145/3357292.3357330.
Zhang et al., "Calculation of the Carrying Capacity of Distrubuted Power Generation in Distribution Network Under Carbon Peaking and Carbon Neutrality Goals," Electrical, Power and Computer Engineering, Apr. 2022, pp. 1-5. https://doi.org/10.1145/3529299.3529308.
Zhang et al., "Wind Power Generation Prediction Based on LSTM," International Conference on Mathematics and Artificial Intelligence, Apr. 2019, pp. 85-89. https://doi.org/10.1145/3325730.3325735.
Zhou et al., "An Online Power Generation Dispatching Method to Improve the Small Signal Stability of Power System with Fluctuated Wind Power," Electrical Power and Computer Engineering, Apr. 2022, pp. 1-12. https://doi.org/10.1145/3529299.3529302.
Advisory Action mailed on Mar. 22, 2023 for U.S. Appl. No. 17/101,784, filed Nov. 23, 2020, 3 pages.
Beltran, H., et al., "Evaluation of Storage Energy Requirements for Constant Production in PV Power Plants," IEEE Transactions on Industrial Electronics, 2012, vol. 60 (3), pp. 1225-1234.
European Patent Application No. 20847753.9, Extended European Search Report dated Jul. 20, 2023.
European Patent Application No. 20847907.1, Extended European Search Report dated Jul. 18, 2023.
European Patent Application No. 20880611.7, Extended European Search Report dated Nov. 3, 2023.
Final Office Action mailed Apr. 11, 2023 on for U.S. Appl. No. 16/529,360, filed Aug. 1, 2019, 46 pages.
Final Office Action mailed Jun. 20, 2023 for U.S. Appl. No. 17/340,643, filed Jun. 7, 2021.
Final Office Action mailed on Jun. 2, 2023 for U.S. Appl. No. 17/513,558, filed Oct. 28, 2021, 15 pages.
Final Office Action mailed on Dec. 6, 2023 for U.S. Appl. No. 17/896,376, filed Aug. 26, 2022, 14 pages.
Final Office Action mailed on Jan. 11, 2024 for U.S. Appl. No. 17/101,784, filed Nov. 23, 2020, 13 pages.
Final Office Action mailed on Oct. 13, 2023 for U.S. Appl. No. 18/066,616, filed Dec. 15, 2023, 10 pages.
Final Office Action mailed on Aug. 4, 2023 for U.S. Appl. No. 17/868,381, filed Jul. 19, 2022, 45 pages.
International Search Report and Written Opinion of PCT Application No. PCT/US2023/22767, mailed on Aug. 4, 2023, 16 pages.
Non-Final Office Action mailed Aug. 6, 2012 for U.S. Appl. No. 12/587,564, filed Oct. 8, 2009, 24 pages.
Non-Final Office Action mailed Nov. 9, 2023 for U.S. Appl. No. 17/340,643, filed Jun. 7, 2021, 21 pages.
Non-Final Office Action mailed May 11, 2023 for U.S. Appl. No. 18/114,503, filed Feb. 27, 2023.
Non-Final Office Action mailed Oct. 13, 2023 for U.S. Appl. No. 18/106,102, filed Feb. 6, 2023, 18 pages.
Non-Final Office Action mailed Mar. 17, 2023 for U.S. Appl. No. 17/868,381, filed Jul. 19, 2022, 49 pages.
Non-Final Office Action mailed Jan. 18, 2024 for U.S. Appl. No. 18/139,010, filed Apr. 25, 2023, 12 pages.
Non-Final Office Action mailed Jun. 21, 2023 for U.S. Appl. No. 17/896,376, filed Aug. 26, 2022.
Non-Final Office Action mailed Nov. 21, 2023 for U.S. Appl. No. 17/513,558, filed Oct. 28, 2023, 16 pages.
Non-Final Office Action mailed Sep. 21, 2018 for U.S. Appl. No. 15/289,272, filed Oct. 10, 2016, 27 pages.
Non-Final Office Action mailed Jun. 22, 2023 for U.S. Appl. No. 17/101,784, filed Nov. 23, 2020.
Non-Final Office Action mailed Apr. 25, 2023 for U.S. Appl. No. 17/340,643, filed Jun. 7, 2021, 4 pages.
Non-Final Office Action mailed Mar. 29, 2023 for U.S. Appl. No. 18/066,616, filed Dec. 15, 2022, 120 pages.
Non-Final Office Action mailed Nov. 30, 2023 for U.S. Appl. No. 18/143,277, filed May 4, 2023, 26 pages.
Non-Final Office Action mailed Oct. 5, 2023 for U.S. Appl. No. 17/479,750, filed Sep. 20, 2021, 4 pages.
Non-Final Office Action mailed Oct. 5, 2023 for U.S. Appl. No. 18/106,098, filed Feb. 6, 2023, 5 pages.
Non-Final Office Action mailed on Apr. 11, 2023 for U.S. Appl. No. 17/353,285, filed Jun. 21, 2021, 4 pages.
Non-Final Office Action mailed on Aug. 17, 2023 for U.S. Appl. No. 17/331,440, filed May 26, 2021, 16 pages.
Notice of Allowance mailed on Nov. 3, 2023 for U.S. Appl. No. 18/106,093, filed Feb. 6, 2023, 4 pages.
Notice of Allowance mailed on Apr. 4, 2023, for U.S. Appl. No. 17/673,318, filed Feb. 16, 2022, 2 pages.
Notice of Allowance mailed on Mar. 8, 2023, for U.S. Appl. No. 16/961,386, filed Jul. 10, 2020, 2 pages.
Notice of Allowance mailed on Dec. 11, 2023, for U.S. Appl. No. 17/868,381, filed Jul. 19, 2022, 10 pages.
Notice of Allowance mailed on Sep. 14, 2023 for U.S. Appl. No. 16/529,360, filed Aug. 1, 2019, 8 pages.
Notice of Allowance mailed on Feb. 21, 2023, for U.S. Appl. No. 17/340,664, filed Jun. 7, 2021, 2 pages.
Notice of Allowance mailed on Mar. 21, 2023 for U.S. Appl. No. 17/692,636, filed Mar. 11, 2022, 09 pages.

(56) References Cited

OTHER PUBLICATIONS

Notice of Allowance mailed on Nov. 22, 2023 for U.S. Appl. No. 18/106,093, filed Feb. 6, 2023, 8 pages.
Notice of Allowance mailed on Feb. 23, 2023, for U.S. Appl. No. 17/353,285, filed Jun. 21, 2021, 5 pages.
Notice of Allowance mailed on Jan. 23, 2024 for U.S. Appl. No. 18/114,503, filed Feb. 27, 2023, 5 pages.
Notice of Allowance mailed on Apr. 24, 2023, for U.S. Appl. No. 16/961,386, filed Jul. 10, 2020, 10 pages.
Notice of Allowance mailed on Apr. 24, 2023 for U.S. Appl. No. 17/692,636, filed Mar. 11, 2022, 08 pages.
Notice of Allowance mailed on Apr. 24, 2023 for U.S. Appl. No. 17/750,883, filed May 23, 2022, 10 pages.
Notice of Allowance mailed on Oct. 25, 2023 for U.S. Appl. No. 16/529,360, filed Aug. 1, 2019, 8 pages.
Notice of Allowance mailed on Sep. 29, 2023 for U.S. Appl. No. 18/114,503, filed Feb. 27, 2023, 5 pages.
Notice of Allowance mailed on Aug. 4, 2023 for U.S. Appl. No. 18/106,093, filed Feb. 6, 2023, 8 pages.
Response to Non-Final Office Action mailed Feb. 6, 2021 for U.S. Appl. No. 12/587,564, filed Oct. 8, 2009, 14 pages.
Response to Non-Final Office Action mailed Dec. 21, 2018 for U.S. Appl. No. 15/289,272, filed Oct. 10, 2016, 10 pages.
Trowler D., et al., "Bi-Directional Inverter and Energy Storage System," Texas Instruments Analog Design Contest, University of Arkansas, May 2008, pp. 1-29.
Yaramasu V., et al., "High-Power Wind Energy Conversion Systems: State-of-the-Art and Emerging Technologies", Proceedings of the IEEE, May 2015, vol. 103 (5), 49 pages.
Appalachian Power Company, SCC Docket Search, PUE-2014-00026, Sep. 5, 2023, Ex. (1025), 4 Pages.
Appalachian Power Company, State Corporation Commission, Commonwealth of Virginia, Nov. 26, 2014, Case No. PUE-2014-00026, Ex. (1019), 51 Pages.
Cho C., et al., "Active synchronizing control of a microgrid", IEEE Transactions on Power Electronics, 2011, vol. 26(12), 13 pages.
Cholla Petitioner's Power of Attorney for U.S. Pat. No. 10,608,433 dated Mar. 3, 20201, 1 page.
Cholla United States District Court for the District of Delaware for U.S. Pat. No. 10,608,433, 1 page.
Decision in Petition for Inter Partes Review dated Mar. 13, 2024 for U.S. Pat. No. 10,608,433, IPR2023-01407, 36 Pages.
Declaration of Andres E. Carvallo mailed Sep. 12, 2023 for U.S. Pat. No. 10,608,433, IPR2023-01407, (Ex. 1003), 103 Pages.
Emergency Demand Response Program Manual, New York ISO, Manual 7, Nov. 2022, Ex. (1010), 50 Pages.
European Patent Application No. 21856804.6, Extended European Search Report dated Mar. 7, 2024.
Final Office Action mailed Feb. 14, 2024 on for U.S. Appl. No. 17/331,440, filed May 26, 2021, 21 pages.
Final Office Action mailed Feb. 15, 2024 for U.S. Appl. No. 17/340,643, filed Jun. 7, 2021, 25 pages.
Gangloff M., "Appalachian Power'sproposed fee targets usersof solar panels," OBM and Cholla Energy, Sep. 8, 2014, Ex. (1017), 3 Pages.
Hua Y., et al., "Building fuel powered supercomputing data center at low cost", Proceedings of the 29th ACM on International Conference on Supercomputing—describes DG systems and associated datacenters, 2015, 10 pages.
Huang Q., et al., "Power Consumption of Virtual Machine Live Migration in Clouds", Third international conference on communications and mobile computing IEEE, 2011, 4 pages.
Letter from W. Hix, Indiana Michigan Power, OBM and Cholla Energy, 2014, Ex. (1035), 7 Pages.
Li C., et al., "Enabling distributed generation powered sustainable high-performance data center", 19th International Symposium on High Performance Computer Architecture IEEE, 2013, 12 pages.
Madrigal R., Overview of Reliability Demand Response Resource, OBM and Cholla Energy, May 8, 2014, Ex. (1014), 74 Pages.
Main I., "Virginia energy policy made interesting," Who's afraid of a Carbon Rule?, Power for the People VA, May 2014, Ex. (1018), 10 Pages.
Main I., "Virginia regulators approve Appalachian Power's solar tax", Dec. 1, 2014, Power for the People VA, Ex. (1016), 5 Pages.
Meagher K., et al., "The Enterprise Data Center as a Microgrid", Uptime Institute Symposium describes data centers as a microgrid that capable of operating in islanding mode and grid connected mode, 2010, 8 pages.
Non-Final Office Action mailed Apr. 3, 2024 for U.S. Appl. No. 18/139,134, filed Apr. 25, 2023, 13 Pages.
Non-Final Office Action mailed Mar. 13, 2024 for U.S. Appl. No. 18/066,616, filed Dec. 15, 2022, 12 pages.
Non-Final Office Action mailed Mar. 29, 2024 for U.S. Appl. No. 18/367,673, filed Sep. 3, 2023, 9 Pages.
Non-Final Office Action mailed on Apr. 30, 2024 for U.S. Appl. No. 18/139,010, filed Apr. 25, 2023, 5 pages.
Notice of Allowance mailed on May 7, 2024, for U.S. Appl. No. 18/114,503, filed Feb. 27, 2023, 5 pages.
Notice of Allowance mailed on May 15, 2024, for U.S. Appl. No. 18/143,277, filed May 4, 2023, 11 pages.
Notice of Allowance mailed on Mar. 5, 2024 for U.S. Appl. No. 18/106,102, filed May 2, 2023, 8pages.
Notice of Allowance mailed on Mar. 5, 2024 for U.S. Appl. No. 18/143,280, filed May 4, 2023, 10 pages.
Office of Electricity, "Demand Response," OBM and Cholla Energy, Ex. (1013), 3 Pages.
Patent Owner Preliminary Response to Petition, dated Dec. 20, 2023, Inter Partes Review for U.S. Pat. No. 10,608,433, IPR2023-01407, 71 Pages.
Petition for Inter Partes Review mailed on Sep. 13, 2023 for U.S. Pat. No. 10,608,433, IPR2023-01407, 92 Pages.
Pitt D., et al., "Analyzing the Costs and Benefits of Distributed Solar Generation in Virginia," OBM and Cholla Energy, 2014, Ex. (1022), 70 Pages.
Pitt D., et al., "Assessing the Value of Distributed Solar Energy Generation," Curr Sustainable Renewable Energy, 2015, vol. 2, Ex. (1021) pp. 105-113.
Pitt D., et al., "Optimizing the Grid Integration of Distributed Solar Energy," Final Presidential Research Quest Fund Grant Report Virginia Commonwealth University, OBM and Cholla Energy, Apr. 2018, Ex. (1023), 78 Pages.
PJM, Working to Perfect the Flow of Energy, OBM and Cholla Energy, Manual 11: Energy & Ancillary Services Market Operations, May 11, 2017, 223 Pages.
Politics Bureaucracy and Justice, West Texas A&M University, OBM and Cholla Energy, 2016, vol. 5(1), Ex. 1024, 41 Pages.
Power of Attorney for Petitioner for U.S. Pat. No. 10,608,433 OBM, Inc, 3 pages.
Powers J., "Implementation Overview for PDR," OBM and Cholla Energy, Aug. 26, 2014, Ex. (1012), 11 Pages.
Reisinger W T., Public Utilities Law, OBM and Cholla Energy, 2014, Ex. (1020), 33 Pages.
Resource Testing Guidelines dated May 18, 2023, Operating Procedure, California ISO, Procedure No. 5330, Ex. (1009), 32 Pages.
The Wayback Machine. SCC Case Information, Public Comments/Notices, 2015, 5, Ex. (1032), 1 Page.
The Wayback Machine. SCC Case Information, Public Comments/Notices, 2015, 5, Ex. (1033), 5 Pages.
Virginia S.C .C . Tariff No. -2425 Appalachian Power Company, OBM and Cholla Energy, Jan. 25, 2015, Ex. (1027), 64 Pages.
Virginia S.C .C . Tariff No. -2425 Appalachian Power Company, OBM and Cholla Energy, Jan. 25, 2015, Ex. (1028), 53 Pages.
Virginia S.C .C . Tariff No. -2425 Appalachian Power Company, OBM and Cholla Energy, Jan. 25, 2015, Ex. (1029), 49 Pages.
Virginia S.C .C . Tariff No. -2425 Appalachian Power Company, OBM and Cholla Energy, Jan. 25, 2015, Ex. (1030), 72 Pages.
Virginia S.C .C . Tariff No. -2425 Appalachian Power Company, OBM and Cholla Energy, Jan. 25, 2015, Ex. (1031), 81 Pages.
Virginia S.C .C . Tariff No. -2425 Appalachian Power Company, PUE-2014-00026, Jan. 14, 2014, Ex. (1026), 69 Pages.
Virginia S.C.C. Tarrif No. 2425 Appalachian Power Company dated Jan. 14, 2014, PUE-2014-00026, Ex. (1005), 389 Pages.

(56) References Cited

OTHER PUBLICATIONS

Wang R., et al., "Datacenters as Controllable Load Resources in the Electricity Market," 2013 IEEE 33rd International Conference on Distributed Computing Systems, Ex. (1014), 10 Pages.
Whited M., et al., "The Problem with Fixed Charges for Electricity," Prepared for Consumers Union, Feb. 9, 2016, Ex. (1034), 58 Pages.
Zeeman J., et al., "Emerging Business Models for Local Distribution Companies in Ontario", 2016, 131 pages.

\* cited by examiner

POWER AWARE SCHEDULING

CROSS REFERENCE TO RELATED APPLICATION

This application claims the benefit of priority under 35 U.S.C. § 119(e) to U.S. Provisional Patent Application No. 63/065,930, filed Aug. 14, 2020. The disclosure set forth in the referenced application is incorporated herein by reference in its entirety.

FIELD

The present disclosure generally relates to scheduling and migration in space and time of computational jobs in a data center.

BACKGROUND

Efforts for controlling Quality of Service (QoS) of a given data center often focus on prioritizing jobs within a load management system and determining whether a particular job, or a class of jobs, can be pre-empted, i.e. suspended or killed.

SUMMARY

A method includes, by a scheduling controller, receiving from a user a request for an application to be executed by a computing system associated with a data center, wherein the application includes a plurality of tasks, and wherein the request includes an estimated execution time corresponding to an estimated amount of real-world time that the tasks will be actively running on the computing system to fully execute the application. The method includes receiving from the user a service level objective indicating a target percentage of a total amount of real-world time that the tasks will be actively running on the computing system and generating, in response to determining that the job can be completed according to the service level objective and the estimated execution time, a notification indicating acceptance of the job. The method includes scheduling a job corresponding to the tasks of the application to be executed by the computing system, wherein scheduling is based on the service level objective and the estimated execution time and notifying, in response to the scheduled job being fully executed, the user that the application execution completed.

A system includes a computing system of a data center, and a scheduling controller communicatively connected to the computing system, the controller being configured to: receive a request for an application to be executed by the computing system, wherein the application includes a plurality of tasks, and wherein the request includes a estimated execution time corresponding to an estimated amount of real-world time that the tasks will be actively running on the computing system to fully execute the application, receive a service level objective indicating a target percentage of a total amount of real-world time that the tasks will be actively running on the computing system, generate, in response to determining that the job can be completed according to the service level objective and the estimated execution time, a notification indicating acceptance of the job, schedule, based on the service level objective and the estimated execution time, a job corresponding to the tasks of the application to be executed by the computing system, and notify, in response to the scheduled job being fully executed, the user that the application execution has completed.

A system including a data center comprising a plurality of computing systems configured to receive power from a power source, and a scheduling controller configured to: monitor an availability of the power that is accessible to the data center, receive an application and a service level objective associated with the application, initiate execution of the application by at least one of the computing systems, in response to a determination that the availability of the power has decreased below a threshold level, suspend execution of the application, and restore, without the availability of the power having increased, execution of the application based on a quotient of an estimated amount of real-world time that at least a portion of the application will be actively running on at least one of the computing systems to fully execute the application and a target percentage of a total amount of real-world time that the tasks will be actively running on at least one of the computing systems.

BRIEF DESCRIPTION OF THE FIGURES

The detailed description particularly refers to the following figures, in which.

DETAILED DESCRIPTION

Figure 1:
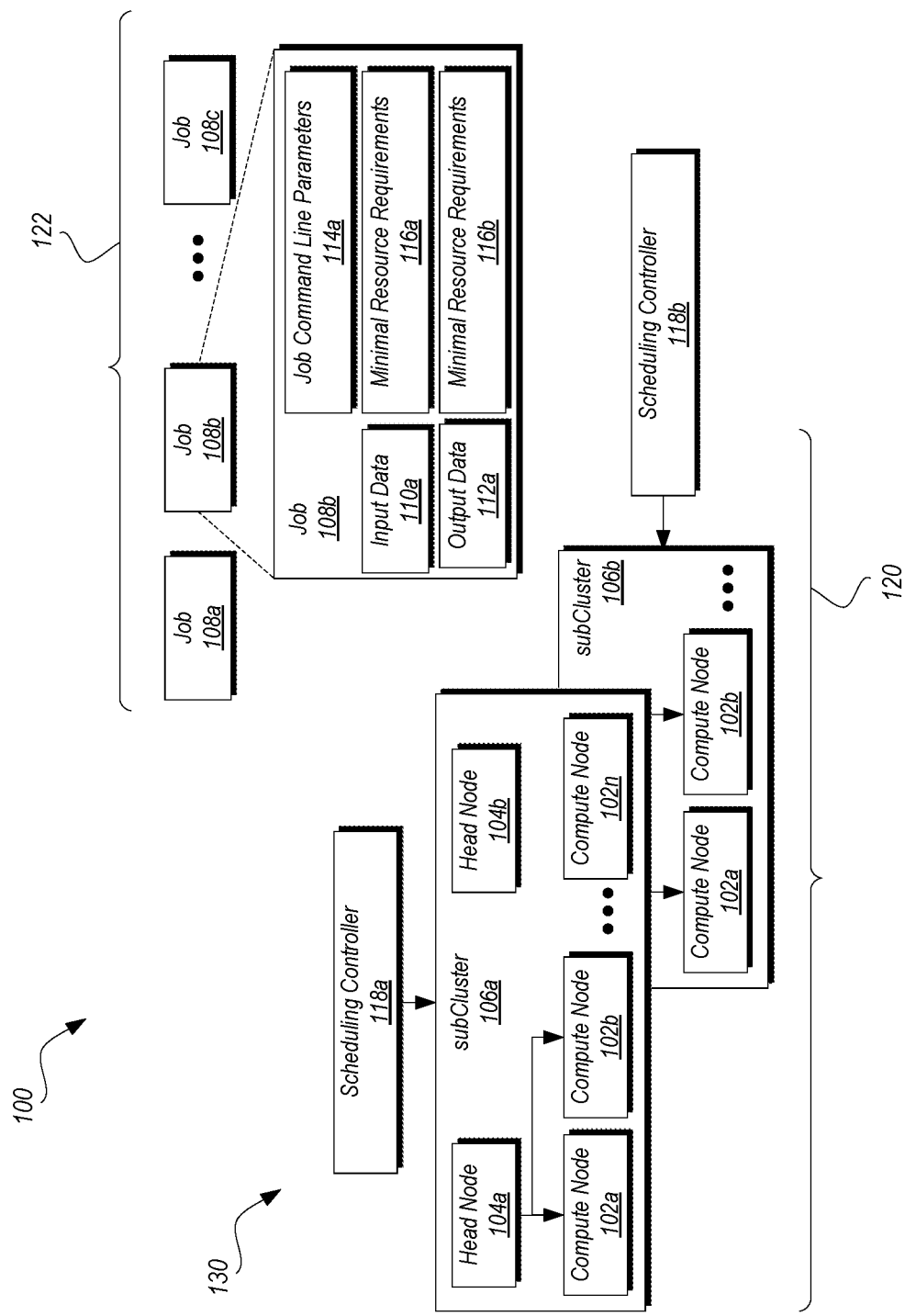
FIG. 1 is a block diagram illustrating a system for executing an application within a data center.

Disclosed examples will now be described more fully hereinafter with reference to the accompanying drawings, in which some, but not all of the disclosed examples are shown. Different examples may be described and should not be construed as limited to the examples set forth herein.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple data centers are illustrated and associated with reference numbers 108a, 108b, 108c, etc. When referring to a particular one of these data centers, such as the data center 108a, the distinguishing letter "a" is used. However, when referring to any arbitrary one of these data centers or to these data centers as a group, the reference number 108 is used without a distinguishing letter.

Prioritizing a given job (or several queues of jobs) as being high-, medium-, or low-priority, as done by conventional schedulers, does not inform a user when execution of that job will begin and, thus, leaves unanswered a question as to when execution of that job will likely complete. Indeed, the priority indicates to the user only that the job will begin executing before another job having a lower priority. Underlying assumptions in traditional workload schedulers, such as, but not limited to, SLURM Workload Manager, Portable Batch System (PBS), and Oracle Grid Engine (OGE, formerly Sun Grid Engine (SGE)), are that the resources available to the job scheduler, or the queuing system, either remain constant or change only in the margins, such as a single node failure. Such assumptions are typically untrue in data centers powered by renewable energy, where available power to run the computers varies, often unpredictably.

Conventional resource schedulers often assume that, once placed on a resource, a given job will remain on that resource for the entirety of an execution cycle of that job and not migrate mid-cycle. Such operational limitations stem from an assumption that provided power level, and, thus, resource availability at the data center, will remain constant, as well as, a practical impossibility of migrating a vast majority of applications once they begin executing on a resource. Accordingly, traditional resource schedulers are incapable of suspending or migrating a job to a different computing resource in response to a change in resource availability, such as a decrease in available power.

Additionally, traditional schedulers often have little to no capacity to provide differentiated QoS, or else provide only basic QoS metrics, making it difficult for users to determine when a given job will complete execution.

Scheduling in Distributed Systems

FIG. 1 illustrates an example system 100 for operating a data center 130. The data center 130 includes a plurality of nodes 102, 104 (e.g., node 102a, node 102b, node 104a, and so on). Each node 102 is a computer comprising one or more processors (cores), RAM, one or more network interfaces, one or more storage devices (hard disk, SSD, NVMe, etc.), and, in some instances, one or more accelerators. Accelerators may be graphic processing units (GPUs), field-programmable gate arrays (FPGAs), or other non-CPU computational devices.

The nodes 102 are organized into subClusters 106 comprising head nodes 104 and compute nodes 102 connected with one another via a high-speed network. Head nodes 104 manage the subCluster 106 and often provide shared file system services to the compute nodes 102. Management software on the head nodes 104 determines in what order and on which nodes 102 the jobs execute. Within a data center 130, subClusters 106 of nodes are often connected using a very high-speed local area networks, e.g., several Gb/s, to facilitate the rapid movement of data.

A job 108 comprises a program (executable, bash script, python script) including input data 110 (including executables scripts, binaries, containers, databases, files, directories), output data 112 (files, directories), and job command line parameters 114. In some instances, jobs 108 may read provided input data 110, interact with one or more external resources or other jobs 108, and generate output data 112. Examples of types of jobs 108 include, but are not limited to, sequential single-threaded jobs, multi-threaded jobs, central processing unit (CPU) jobs, mixed CPU and accelerator jobs, and parallel jobs, such as Message Passing Interface (MPI) standard-based applications.

A job 108 has one or more minimal resource requirements (MRR) 116 necessary for executing. Example minimum resource requirements 116 may include, but are not limited to, specifications regarding an amount of available memory, e.g., a predefined number of gigabytes (GB) within a random-access memory (RAM), a predefined number, type, and/or speed of processor cores, a predefined number of nodes, an operating system (OS) version, an interconnection network type, e.g., switched 10-gigabit (Gb) Ethernet, InfiniBand, one or more required software packages and configurations, a predefined amount of disk space, a mounted file system, and predefined file system performance requirements. It should be noted that a given job may include several distinct, mutually exclusive, or interdependent MRRs, such as a first MRR requiring 32 processor cores and 64 GB of memory and a second MRR requiring 4 cores, 64 GB of memory, and a K80 GPU.

To complete, a job 108 must be placed and executed on one or more nodes 102. The decision regarding when to run a job 108 and on which particular nodes 102 is an instance of a scheduling problem. Schedulers (hereinafter, scheduling controllers) 118 of the data center 130 are designed to optimize some objective function such as minimizing job execution time, minimizing average delay, or maximizing resource utilization.

Scheduling a given job includes determining when, and on which nodes 102, the job 108 should be run or executed. Specifically, for a set of resources (e.g., nodes 102) R 120 and a set of jobs J 122, scheduling consists of mapping the jobs J 122 onto the resources R 120, such that J→R, and determining the timing and ordering of the execution of each of the jobs J 122 on each of the resources R 120. There are many different ways to map any given job 108 to any given resource 120. Indeed, an exponentially large state space of different choices exists for such mapping. Further, selecting one of the available choices over another leads to different outcomes for predicted job completion time, cost, and resource utilization efficiency. Determining an optimal solution is not computationally tractable. Any algorithm to finding an optimal solution is NP-hard, such that, as long as P!=NP, and there are no effective quantum computers that can solve such large problems, computing an optimal solution is essentially impossible.

Power Variability in Data Centers

Traditionally, data center designers go to great lengths to ensure constant power at the data center. For example, in "lights out" data centers one usually has two different sources of external power from different power vendors in addition to local battery or generator power if the external power fails.

Cost of power may represent as much as 40% of the cost of running a data center. Data centers that can adapt to power variability will be able to operate when power varies and be able to operate more profitably by reacting to power price changes. Dynamic power prices changes may make computing at a particular data center unprofitable, causing shutting down of the machines for all but the most valuable computations.

There are a number of factors that impact the power availability and price at data centers. These include but are not limited to: 1) Changes in power output from renewable energy systems such as wind, solar, and tidal energy sources. When the power output drops below the amount of power required for full operation resources must be turned off even if there are jobs running on them unless there are sufficient battery resources to continue operation. Data centers consume megawatts of power, and renewable energy resources can suffer from reduced power availability for hours to days. Multi-MW output batteries that can hold hundreds of MW hours of power are extremely expensive. 2) Directives from power grid operators to decrease power consumption or permission to increase power consumption. For example as found in capacity management systems such as demand response and Coincident Peak power environments. 3) Power grid and internal electrical system failures, e.g., down power lines, grid operations shutdowns, such as the shutdowns experienced in California in 2019, transformer blowouts, and cable cuts.

It is often possible to predict future variations in power availability or price. It is desirable for a distributed systems scheduler 118 to take into account power variations and price as well as future likely variations. For example, the scheduler 118 may choose to suspend and/or turn off some resources 120 now and run the jobs 122 later if more or cheaper power will likely be available in a few hours. Unfortunately, incorporating such information can make the scheduling problem even more computationally complex.

Quality of Service (QoS)

Quality of Service refers to non-functional aspects of execution of a job by a system, such as availability, reliability, security (e.g., authentication, authorization, accounting, and data integrity), and performance, etc. A conventional situation may involve a system provider and a client agreeing upon a particular level of service (e.g., 99.99% availability) via a service level agreement (SLA). A SLA can be for a set of interactions over a defined period of time, or for a single job. The SLA may also specify penalties for the system provider failing to meet the SLA. As such, the SLA may include a Service Level Objective (SLO) for any given application, which may be the responsibility of the system provider to maintain. Accordingly, meeting the users performance expectations as stated in an application SLO is an important metric in ensuring customer satisfaction. Other embodiments may incorporate other QoS dimensions: reliability, security, availability, auditability, etc.

The disclosed distributed system scheduler optimizes customer value in the presence of power variability and power price fluctuations. The disclosed distributed system scheduler utilizes a new QoS model that permits users to reason about when their jobs will complete as well as trade-off performance, reliability, and cost. The disclosed distributed system scheduler operates based on a new class of QoS-enforcing, dynamic, scalable, hierarchical, computational job scheduling techniques to accommodate variable and uncertain resource availability, e.g., as caused by reduced power at a data center, by ramping up and down compute nodes, suspending and resuming jobs, and migrating jobs within a given data center.

The distributed system scheduler of the present disclosure utilizes both hand-written heuristics, as well as, the application of reinforcement learning techniques rather than heuristics to the job placement and migration (scheduling) problem in distributed systems.

Additionally, a site power management strategy is described wherein power consumption is scaled down in such a manner as to optimize customer value as expressed by QoS level by defragmenting (packing) jobs across nodes, hibernating nodes, suspending jobs, and powering down nodes.

A subCluster packing strategy is described that reduces the amount of fragmentation of node resources, packing active jobs onto nodes to increase the utilization of node resources on selected nodes, while completely freeing up other nodes for either larger jobs, or allowing the nodes to be powered down, reducing energy consumption to just what is needed to execute the current job mix.

As stated earlier, factors that influence power availability affect resource availability at data centers, thereby, causing a job scheduling problem. The new QoS model allows users to determine when a given job will complete and provides the scheduler with the option of selectively pausing and migrating jobs mid-execution cycle.

Novel Quality of Service Model

Customer value is specified via a new novel quality of service model that allows customers to determine the rate of progress of execution, and, thus, a planned completion time, of a given job or application. The system specifies a broad range of QoS categorization levels, rather than a small number of levels, such as high, medium, and low, pre-emptible and non-pre-emptible, and so on. The system of the present disclosure guarantees progress of a given application without starvation. The system provides for establishing with a high degree of confidence whether a QoS requested for a given job can be met.

More precisely, the QoS of a job is a real number within a range between, and including, zero (0) and one (1), that specifies a percentage of a period of time that begins when a job is submitted by the client and ends when a completed job is accepted by the client that the job will have the resources available.

In such an example, a user, given an accurate estimate of execution time, can determine when a given application will complete. A time to complete (TTC) value may be indicative of a time to complete executing an application and may be determined based on a quotient of the execution time requested in the application request and a target percentage, as shown in Equation (1), such that:

$$TTC = \left(\frac{1}{Q}\right) * X, \qquad (1)$$

where Q is indicative of the target percentage value 172 expressed as a numerical value between zero and one, and where X is indicative of execution time and may correspond to the execution time in the AR.

In an example, if allowed to run uninterrupted, a given job may be expected to complete in ten (10) hours of computation, e.g., X=10 hours. If the QoS associated with the job, as specified by the client, is Q=0.9, then the user can expect the job to complete in TTC, such that $$TTC = \left(\frac{1}{0.9}\right) * 10 = 11.11 \text{ hours.}$$

In another example, if the execution time data indicates that a predicted execution time is thirty minutes and the target percentage is fifty percent, e.g., the value Q=0.5, then the time-to-complete data may indicate that the time to complete execution of the application is one hour. In some scenarios, the TTC value for executing a given application may be adjusted to account for a data transfer time, such as the time to load the application into the queue, and other processing time not directly associated with the execution time. Thus, the system may differ from a conventional queuing system by increasing transparency and informing the client of a wider range of parameters that may be subject to change.

Higher QoS values cost more than lower levels of QoS. Users then prioritize a given job by a given willingness to pay. It should be noted that payment by the client need not be with currency, but, instead, needs only be something of value, such as, allocations units and other payment methods. Further, price may not be a linear function of a target percentage, e.g., a target percentage of 80% may be either more or less than twice as expensive as a target percentage of 40%.

Traditional queuing systems are unable to guarantee that processing/execution resources necessary to execute a job are available immediately upon job submission. As such, traditional workload scheduling systems cannot be relied upon to inform business decisions that depend on knowing, with relative certainty, a TTC value for a given job. Moreover, prioritization scheme of traditional scheduling systems may cause jobs that arrive after jobs already in queue, but having a higher priority, to execute first, thereby, further delaying execution of the lower priority jobs already in queue.

The model allows an infinite number of different performance QoS objectives. An SLO may comprise a range of QoS values, thereby, reducing a number of discrete values the scheduler needs to consider. For example, one possible set of QoS values is {0.0, 0.25, 0.5, 0.75}. The ranges to three decimals of precision then are {0.0-0.249, 0.250-0.499, 0.500-0.749, and 0.750-0.999}.

Extension of the Standard Scheduling Model

Figure 2A:
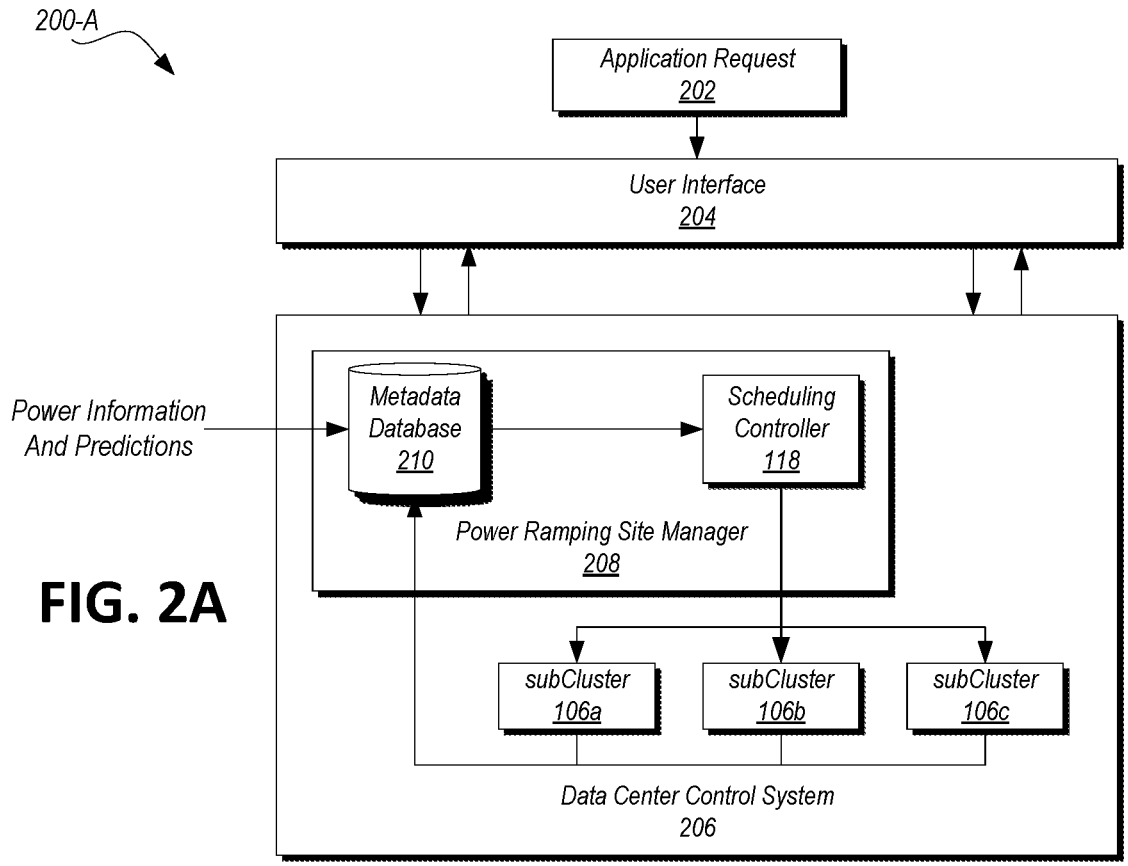
FIGS. 2A-2B are block diagrams illustrating example implementations of the system of FIG. 1.
Figure 2B:
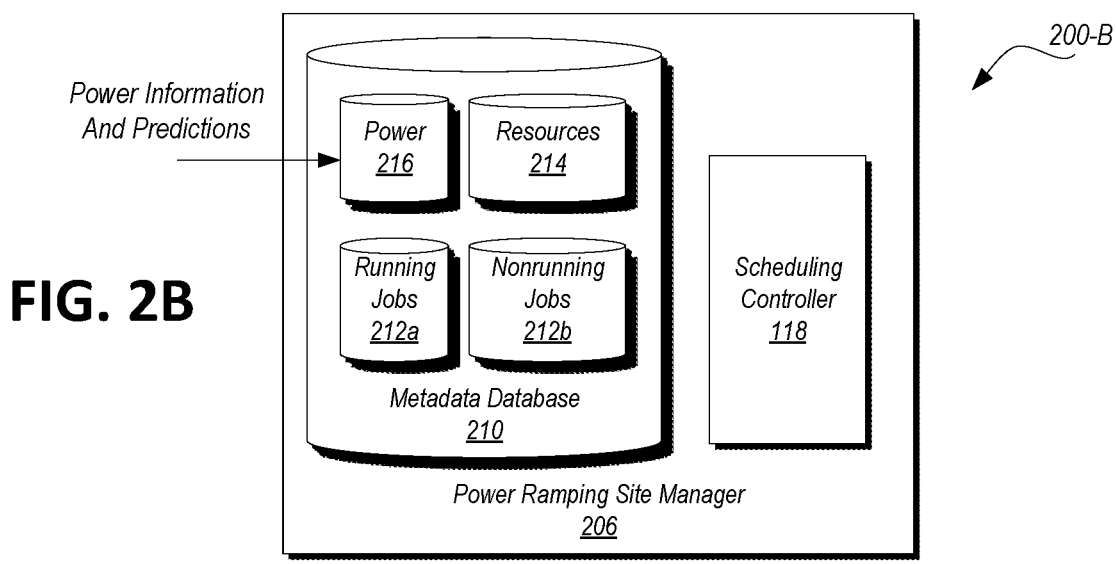

As described further in reference to at least FIGS. 2A-2B, job metadata 210 may include job input and output data, minimal resource requirements (MRR) necessary for executing the job, the storage location of the persistent state of the job, the startTime when the job was admitted, expectedRunTime, maxRunTime, the service level objective (SLO), the backward recovery interval, the currentRunTime, estimated power consumption (EPC), Δvalue/dt, Δpower/dt, and slackTime.

Input and output files. The input files are the files the user has specified must be available for the job to run. The output files are the files the application will generate, and must be made available to the user post-execution.

Minimal resource requirements may include, but are not limited to, specifications regarding an amount of available memory, e.g., a predefined number of gigabytes (GB) within a random-access memory (RAM), a predefined number, type, and/or speed of processor cores, a predefined number of nodes, an operating system (OS) version, an interconnection network type, e.g., switched 10-gigabit (Gb) Ethernet, InfiniBand, one or more required software packages and configurations, a predefined amount of disk space, a mounted file system, and predefined file system performance requirements. As described in reference to at least FIG. 1, a given job 108 may include several distinct, mutually exclusive, or interdependent MRRs 116, such as a first MRR 116a requiring 32 processor cores and 64 GB of memory and a second MRR 116b requiring 4 cores, 64 GB of memory, and a K80 GPU.

Storage location of the persistent state of the job. When the job 108 has made progress in execution, but is not currently executing, the state of the job 108 is stored on persistent, reliable storage. The persistent state consists of application parameters, executable names (including but not limited to binaries, scripts, containers, and virtual machine images), a memory image sufficient to restart the job 108 (including operating system variables, such as the open file table), and the set of files and directories the job 108 was using.

startTime variable is indicative of a time when a job 108 was accepted by the scheduler.

current runtime is the amount of wall clock time the job 108 has executed so far.

The service level objective variable is indicative of a performance parameter used to evaluate As described above, the service level objective variable may be a variable agreed-upon between a service provider (a data center) and a user (a client or a customer) during application request submission and acceptance process.

The backwards error recovery interval variable indicates how often a checkpoint of the job 108 is to be taken throughout execution process. If a job execution fails mid-process, the job execution is automatically restarted from the last checkpoint of the job.

Estimated run time and maximum run time values are provided by the user. The estimated run time is typically treated as being very approximate and not necessarily supported by factual knowledge of how long a job 108 make take to execute. The maximum run time tells the system when to terminate the job 108 if it has not self-terminated. To encourage accurate estimates the user may be rewarded for an estimate close to the actual run-time.

Estimated power consumption variable indicates an amount of power the job 108 is expected to consume while running. This value is computed by the system.

$\Delta$value/dt. $\Delta$value is the change in value the job 108 will accrue if the job receives dtime more time (when dtime is positive), and, if the job 108 is suspended for dtime (when dtime is negative) the drop in value of the job. A drop in value of the job 108 occurs when a suspension for dtime time units causes the job 108 to violate a corresponding SLO and represents a penalty for missing an SLO.

$\Delta$value/dKW variable represents a change in value of the job 108 per KW at this point in time.

slackTime( ) variable returns a number of time intervals until the job violates it SLO.

A job 108 is executing if the job 108 both exists as one or more loaded processes on some number of nodes and is not in a suspended state. In other words, the job 108 is loaded onto one or more CPUs and accelerators.

A suspended job is a job 108 that was executing on at least one node but has been frozen or suspended using operating system mechanism. In the suspended state a job 108 does not execute instructions, but occupies memory and holds operating system resources.

A job 108 may be persisted (i.e., a checkpoint taken) to a file or set of files on non-volatile storage, e.g., hard disc drive (HDD), solid state drive (SSD), or non-volatile memory express (NVMe), and subsequently restarted on the same or another equivalent node (a node having the same resource description) without changing the output of the job 108. The set of files saved, combined with the job input files and files written so far comprises a job state. The job state is stored on persistent stable storage (PSS) associated with each subCluster. Thus, when a job 108 is persisted, a resource mapping of the job is changed from being mapped to a node 102 within a subCluster, to being mapped to the corresponding PSS of the subCluster.

Job migration includes taking job state on one set of physical resources, moving the job state to another set of physical resources, and restarting the job 108 on the other set of resources. In the case of interactive jobs 108, network addresses must be updated to reflect the new job location. Job migration may include live migration where the job 108 never stops servicing requests, as well as, direct transfer of a job 108 without persisting the job to non-volatile storage.

Figure 3:
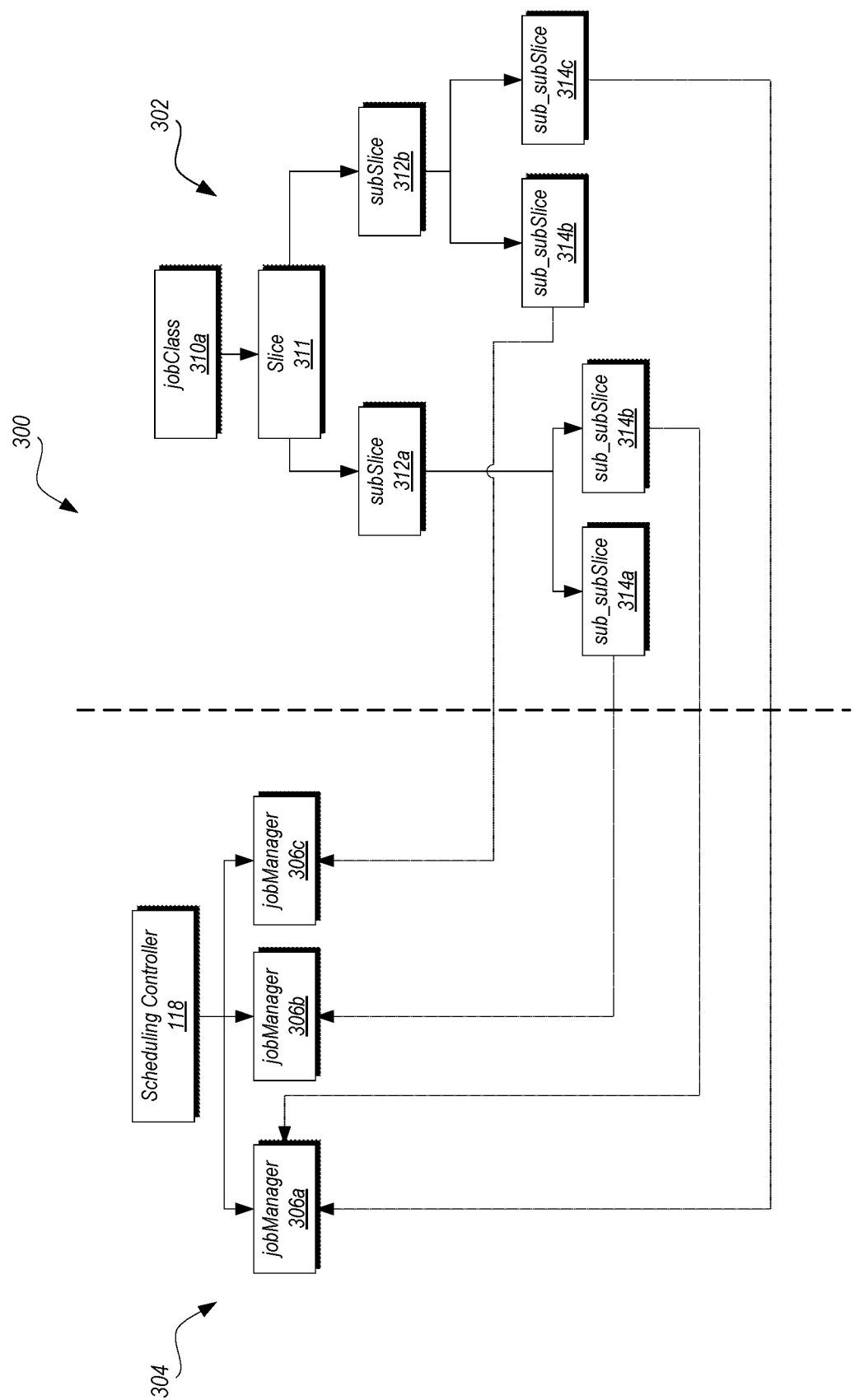
FIG. 3 is a block diagram illustrating hierarchical subdivisions for managing jobs and resources of the system of FIG. 1.
Figure 4:
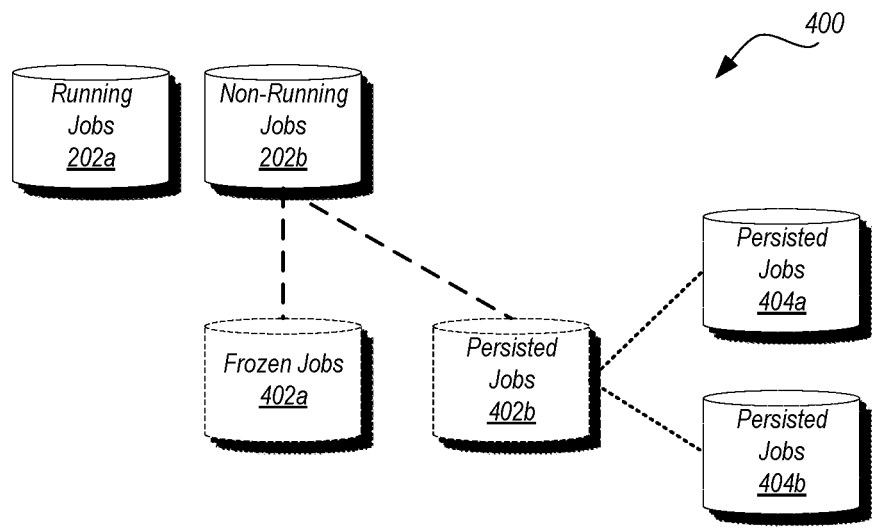
FIG. 4 is a block diagram illustrating states of jobs of the system of FIG. 1.

FIG. 3 illustrates an example system 300 for classifying job subsets 302 with respect resource subsets 304 in accordance with the disclosed scheduling system. A jobClass 310 is a subset of the plurality of jobs J 122 in the system 100 that share a sub-range of the qualities of service and a requirement for a particular resource type and a set of similar MRRs 116. For example, a first job set 310a may be a high-GPU job set and may include all jobs having a QoS requirement greater than 90% and further including a requirement for a GPU. As another example, a second job set 310b may be a medium-CPU job set and may include all jobs having a QoS requirement between, and including, 50%-70% and further including a requirement for CPUs only. Of course, many other definitions for one or more jobClasses 310 are possible.

The use of jobClasses 310 reduces the computational complexity of the scheduling problem by enabling partitioning resources R 120 into subsets of resources 304 that share the attributes specified in MRR 116 of each of the corresponding jobs 108. As such, the scheduling controller 118 may be configured to map subsets of jobs 302 onto subsets of resources 304 that meet the requirements of the subsets of jobs 302.

The intersection over all jobClasses 310 comprises an empty set { } and the union over all jobClasses 310 comprises a set of all jobs J 122.

A slice 311 of a jobClass 310 comprises a subset of a particular jobClass 310. In some instances, the slice 311 of the jobClass 310 may include two or more subSlices 312. Each subSlice 312 may in turn include corresponding sub_subSlices 314 further partitioned into sub_sub_subSlices 316, 318, thereby, forming a tree of subSlices 312 and their further subsets. For the sake of clarity, throughout this disclosure, whenever subSlices 312 are discussed, it is understood that the discussion encompasses one or more subSlices 312, and their direct and indirect sub-divisions, e.g., sub_subSlices 314.

The subSlice Constraint. The intersection of all slices 312 at any given level is the empty set { }. The union of all slices 312 at any particular level of the subSlice tree is the set of all jobs.

Each subSlice 312 of a jobClass 310 includes one or more associated attributes and/or functions that are used by the scheduling controller 118 in mapping subSlices 312 to subClusters 106. Example associated attributes include, but are not limited to, one or more MRRs 116 the slice 312 inherited from its corresponding jobClass 310; the number of jobs 108 in the slice 312; the sum of all specified cores, memory, and GPUs requested by the subSlice 312; the current weighted average of the achieved QoS level of the slice 312, wherein the current weighted average of the QoS level of the slice 312 is distinct from the overall QoS requirement specified for the job 108 and may comprise a sum of a current QoS level for each job 108 of the slice 312 multiplied by a number of hours elapsed since that job 108 was submitted. Additional functions referred to later in this disclosure include:

RRTMQL.<cores,memory,gpus,other_devices>
Required_Resources_To_Maintain_QoS_level( ) is a function that returns the number of cores, memory, GPUs, and other devices that are required to keep the current weighted average from decreasing.

RRTPV<cores,memory,gpus,other_devices>
Required_Resources_To_Prevent_Violation( ) is a function that returns the number of cores, memory, GPUs, and other devices required to prevent one or more jobs from violating a given SLO.

dSLO_dt(cores,memory,gpus) is a derivative taken with respect to a unit of time (e.g., 0.1 hour) of the current weighted average of the QoS level given the number of cores, the amount of memory, and the number of GPUs.

Resources at a data center 130 include compute nodes 102 and storage, and networking resources. A compute node 102 is a computer with processors, memory, optional local storage, network interfaces, and optional accelerators such as GPUs, FPGAs, and other co-processors.

Each node 102 has multiple power states with predefined ranges of power consumption in watts. Example power states include an unpowered state, an off state, an idle state, a CPU-only state, and a CPU-and-accelerator state. An unpowered state may indicate that no power is available to the node, i.e., the node 102 consumes 0 W. An off state may indicate that the node is "off", but a baseboard management controller (BMC) is "on" and is capable of providing Intelligent Platform Management Interface (IPMI) functionality. For example, even in an off state, a given node 102 may consume 50-60 W. An idle state indicates that a node 102 is not running any jobs 108, and the clock frequency and voltage have been turned down to the minimum. For example, a given node 102 may consume between 150 W and 200 W of power in an idle state. A CPU-only state indicates that a node 102 without accelerators and having a predefined minimal disk storage space where the CPUs are running at 100% capacity. For example, a given node 102 in CPU-only state may consume 350-450 W of power. A CPU-and-accelerator state indicates that a node 102 is running CPUs and the accelerators at 100%. For example, for a given node 102 equipped with a pair of accelerators, such a node in a CPU-and-accelerator state may consume 900-1050 W of power.

Transition times between states vary depending on specifications and operating capabilities of the computing devices of the node 102. To transition a given node 102 from an unpowered state to the off state (or the reverse) may take less than ten seconds. To transition a node 102 from an off state to an idle state may take up to ten minutes on modern servers with accelerators. Transitioning a node 102 from an idle state to an off state may take as little as 30 seconds, if the machine is transitioning to "off and hibernate", or as much as five minutes, if the machine is transitioning to "off and a reboot on start". The transition times to and from CPU-only and CPU-and-accelerator states are very low, e.g., less than one second.

As described in reference to at least FIG. 1, a subCluster 106 is a set of compute nodes 102 and one or more head nodes 104. Further in reference to FIG. 3, the scheduling controller 118 monitors and controls a plurality of subCluster jobManagers (hereinafter, jobManagers) 306, where each jobManager 306 manages and controls operations of the subCluster 106 under its control. For example, in addition to scheduling the jobs 108 onto the nodes 102, each jobManager 306 of the present disclosure also manages the power consumption of the nodes 102 under its control, optimizes value per KW of power, migrates jobs 108 between nodes 102 in order to pack the nodes 102, ensures that subSlices 312 under its control meet their SLOs, and transitions nodes 102 between energy states.

In one example, jobManagers 306 are assigned subSlices 312 by the scheduling controller 118 to manage. Accordingly, it is the task of the jobManager 306 to follow the power increase/decrease commands of the scheduling controller 118 and ensure that the jobs 108 in the subSlices 312 meet their SLOs. If the jobManager 306 determines that the SLOs of a subSlice 312 under its control cannot be met, the jobManager 306 notifies the scheduling controller 118 within a threshold time interval of an impending SLO violation.

To assist the scheduling controller 118 of the data center 130 in achieving its goals the jobManager 306 makes subCluster metadata 210 available to the scheduling controller 118 via the metadata 210. This metadata 210 includes, but is not limited to:

AllIdleKWs—how much power the subCluster 106 consumes when there are no jobs running and all the compute nodes 102 are in the idle state.

CurrentKWs—the power consumed by the subCluster 106 in the current time interval.

SlackKW—the power savings from transitioning all nodes 102 currently in an idle state to the lowest power state the nodes 102 can reach (e.g., off state or unpowered state.)

AllOffKW—the power the subCluster 106 will consume if all compute nodes 102 are in their lowest power state. AllOffKW value may be non-zero if it is not possible to unpower all nodes 102.

MinPowerToMaintainSLO—the power required to ensure that all jobs 108 in all managed subSlices 312 maintain their current slack time. In other words, no jobs start to fall behind. This can be determined by summing up the resources needed from subSlices 312 using their RRTMQL function. Using that information, the scheduling controller 118 determines the number of nodes 102 sufficient to meet the resource requirements and sum up the power needed to keep those nodes running using the node power requirements. The scheduling controller 118 adds to the power needed the minimum power state requirements for the nodes 102 that will be powered down.

MinPowerToPreventViolation—the power required to ensure that no SLO violations occur. This can be determined by summing up the resources needed from subSlices 312 using their RRTPV. Using that information, the scheduling controller determines the number of nodes 102 sufficient to meet the resource requirements and sums up the power needed to keep those nodes 102 running using the node power requirements. The scheduling controller 118 adds to the power needed the minimum power state requirements for the nodes 102 that will be powered down.

Resource Count[resourceType]—For each resourceType (e.g., CPU, GPU), how many of that type are there. For example, how many CPUs does the subCluster 106 have.

AvailableCount[resourceType]—For each resourceType (e.g., CPU, GPU), how many of that type are unused in nodes 102 that are turned on.

NodeDescription—Includes the type and number of cores, the amount of memory, the GPU type and count (if any), the network speed in GB/s, and a table of the power consumed for each power state the node 102 can reach. If the subCluster 106 is heterogeneous, then there will be multiple node descriptions.

FIGS. 2A-2B illustrate an example system 200 for meeting QoS objectives (or SLOs) for a plurality of applications (or jobs 108) subject to resource and power availability constraints. The system 200 may be implemented within a data center 130, or within another computing platform or architecture.

The system 200 includes a user interface 204, a scheduling controller 118, a plurality of resources R (illustrated as compute nodes 102 assigned to subClusters 106), a jobManager 306 for each subCluster 106, a plurality of jobs J, and metadata M 210.

Metadata M 210 includes information describing the plurality of jobs J 108, information on each job j∈J, the jobClasses, the subSlices, the mapping of jobs to jobClasses and subSlices, the subCluster metadata, the mapping of subSlices to subClusters, as well as the actual and predicted (with or without probability distributions) power availability and prices. Metadata M 210 may be accessible, i.e., readable and writable, throughout the system 200. Other examples of the system 200 may include more or fewer components in other arrangements.

Within the data center the scheduling controller partitions the set of nodes into subClusters 106a-106c. A subCluster 106 may comprise a plurality of homogeneous compute nodes 102, a cluster switching infrastructure that also links to the site switching infrastructure, and a head node 104 that includes a file system server with sufficient scratch storage for the jobs and a given persistent states. subClusters 106 are used to aggregate a large number of nodes 102 into a single entity to manage (and reduce computational complexity of scheduling), fault encapsulation, and power management reasons. Each subCluster 106 has a jobManager 306 that is responsible for managing the nodes of the subCluster 106 and all of the jobs and job subSlices 312 placed on the subCluster 106.

The user interface 204 of the system 200 may be configured to accept user input indicating a submission of one or more applications (or jobs) to be executed by the system 200. The user interface 204 may interact with users using one or more of an Application Programming Interface (API), a Graphical User Interface (GUI), a Command Line Interface (CLI), and a Web Interface. In one example, the user interface 104 may use one of the API, the GUI, the CLI, and the Web Interface to receive an application request from the user.

An application request 202 describes the application to be executed, the resources required by the application (CPU type and number), memory required, the expected execution time required by the application, the maximum time the application will execute, the data sets to be used, the application parameters, and the QoS requested by the application. An AR may specify the execution of a single application, or a set of applications, e.g., an array job, a set of communicating jobs, or a complete workflow (usually represented as a graph, often a Directed Acyclic Graph). The AR may include additional information, or less information depending on the embodiment. Further, different embodiments may encode the AR in different ways.

The scheduling controller 118 receives several event types from external actors. It receives 1) ARs from the UI, 2) commands from the external power provider to decrease power consumption to a particular level by a certain time, 3) information from the external power provider that the SC can increase power consumption to a particular level, 4) and information from the external power provider on predicted future power levels and prices.

The scheduling controller 118 also receives notifications from the subClusters 106. subClusters 106 notify the scheduling controller 118 when: a job or subSlice 312 completes, the resources in the subCluster 106 have changed (usually due power level changes, node failure of some kind or a node coming back into service), or a subSlice 312 is about to violate its SLO and the resources required right away to prevent violation.

Figure 5:
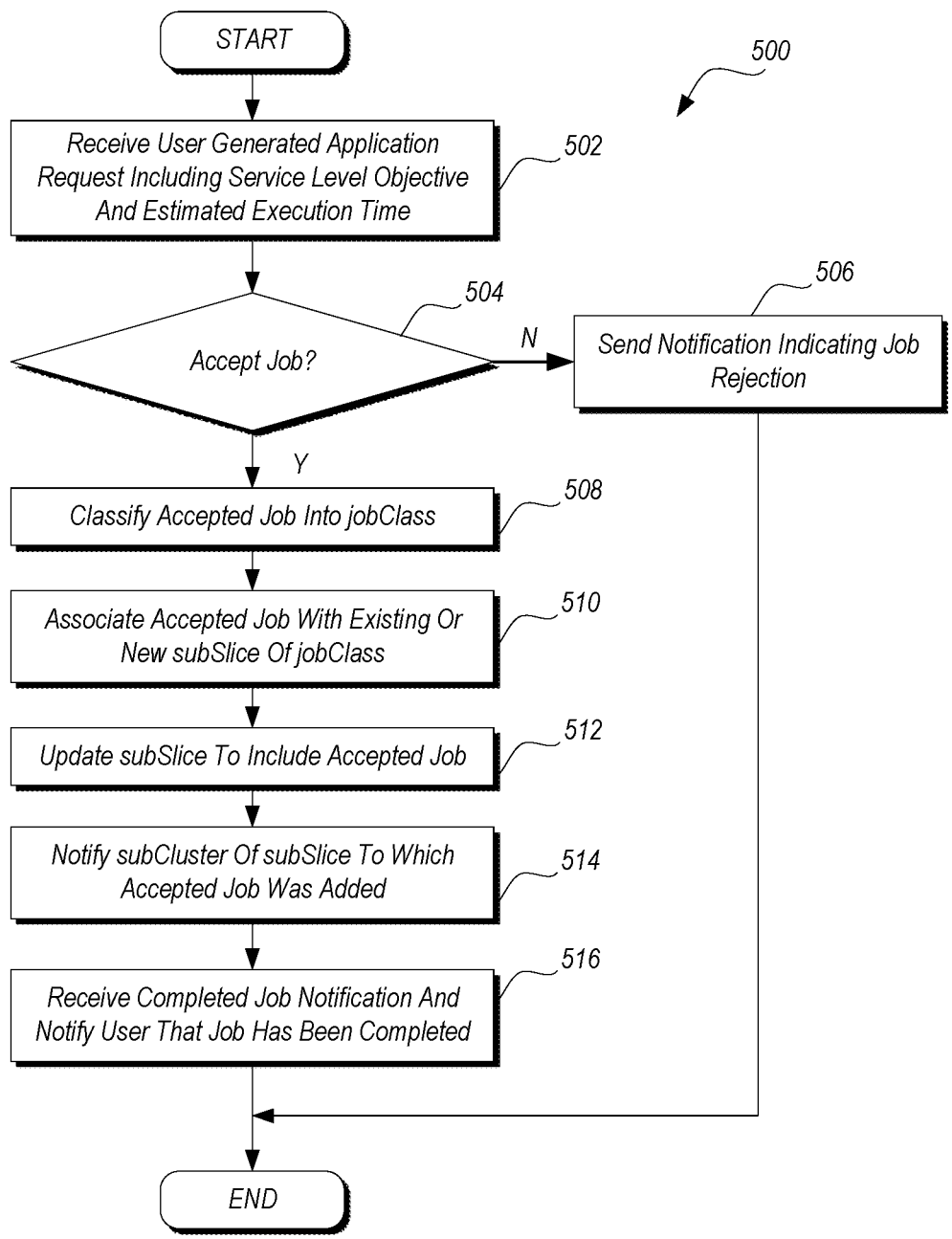
FIG. 5 is a process flow diagram illustrating a method for receiving an application request.

FIG. 5 illustrates an example process 500 for receiving an application request 202 at the data center 130. The process 500 begins at block 502 where the scheduling controller 118 receives a user generated request for an application to be executed by one or more resources (e.g., nodes 102) of the data center 130 In some instances, the application may include a plurality of tasks. The request may include one or more specified parameters as desired (requested) or estimated by the user. For example, the received application request may include an estimated execution time, where the estimated execution time corresponds to an estimated amount of real-world time that the tasks will be actively running on one or more nodes 102 of the data center 130 to fully execute the application (e.g., execute all tasks of the application). The scheduling controller 118 may receive a service level objective (SLO) value requested by the user. As discussed above, the user may select a given SLO value from among a plurality of available (or offered) SLO values based on a variety of factors including monetary or non-monetary price associated with each of the plurality of available (or offered) SLO values. The SLO value may be indicative a target percentage of a total amount of real-world time that the tasks will be actively running on one or more nodes 102 of the data center 130.

The scheduling controller 118, at block 504, determines whether to accept the job 108. The scheduling controller 118 may be configured to accept the job in response to determining that the job can be completed (or application executed) according to the requested SLO for the job and the estimated execution time given the current system state. Otherwise, the scheduling controller 118 may be configured to reject the job. In response to rejecting the job, the scheduling controller 118, at block 506, sends a corresponding notification to the user. In some instances, following a rejection, the system may be configured to offer the user an option to change the resource requirements or QoS requested and re-submit the application request.

The scheduling controller 118 uses an estimator that is guaranteed to have no false accepts, but may generate false rejects. As such, the scheduling controller 118 computes at job start an estimated job completion time that assumes that each job 108 gets exactly minimum SLO of resources. In other words, the scheduling controller 118 determines the time by which the job must complete if the SLO is to be met in executing the job, i.e., a delivery deadline (DL) for the job.

Then, every predefined time period, the scheduling controller 118 updates the following parameters for each job 108:

Time Consumed=the amount of real-world time (or wall clock time) that the job has executed so far. The time consumed value may be more than the minimum. In this case, "time in the bank" is available and impacts future resource needs.

Time till Deadline (TTDL)=the amount or time remaining till the deadline.

Remaining Compute Time=Estimated Run Time−Time consumed.

Effective SLO (ESLO)=RCT/TTDL. The ESLO may be lower than the SLO because some time has "banked".

Required Resource[resourceType] per period=resourcesRequested[resourceType] *ESLO.

The scheduling controller 118 maintains, for each resourceType, e.g., CPU, GPU, a vector ResourcesConsumed$_{resourceType}$ that indicates the resource consumption estimates for each time period in the scheduling horizon. For example, if the time period is 0.1 hour, and the scheduling controller 118 is tracking 96 hours into the future, each vector ResourcesConsumed$_{resourceType}$ would have 960 entries. Each time period the scheduling controller 118 updates each element of the vectors with a value of the sum over all jobs j active in that time period j.ResourcesRequired [resourceType]. A job is active in a time period if and only if the time period is before the job is expected to complete, i.e., before the deadline.

The scheduling controller 118 then computes an average required resources per time period for the job described in the application request. Then, for each time period, until the job completes, if the job received the average required resources for every time period, the scheduling controller 118 checks whether ResourcesConsumed$_{resourceType[period]}$+ j.resourcesRequested[resourceType]*SLO is less than the resource available. If the sum of resources expected to be consumed for a given time period and resources required by the job is less than an available resource value, the scheduling controller 118 accepts the job, and adds an estimated resource consumption of the accepted job to the appropriate resourcesConsumed vectors. If the sum is greater than the available resource value, the scheduling controller 118 rejects the job.

In response to accepting the job, the scheduling controller 118, at block 508, classifies the accepted job based one or more parameters associated with that job and places the job into one of the existing jobClasses 310, or if a suitable existing jobClass 310 is not identified, into a newly created jobClass 310 along with a single empty subSlice 312. The scheduling controller 118, at block 510, selects an appropriate subSlice 312 of the selected jobClass 310 and, at block 512, updates the selected subSlice 312 to reflect the accepted job. At block 514, the scheduling controller 118 notifies the subCluster 106 that manages the subSlice 312 to which the new job has been added.

At this point the job has been accepted and an initial schedule to a subCluster has been made. The jobManager 306 schedules the job on a resource (see, e.g., FIG. 6). The job may or may not execute continuously until completion. The job may be suspended, persisted, restarted, and migrated both within and between subClusters 106. At block 516, the scheduling controller 118 receives a notification (e.g., from the jobManager 306 that manages the subCluster 106 on which the job completed execution) that job execution is complete and may send a corresponding notification to the user indicating job completion. In some instances, when the job completes (or fully executes), the scheduling controller 118 copies output data of the job, if any, to a location indicated in the job request, and stores the job metadata in a logging database. The process 500 may then end. In some examples, the process 500 may be repeated in response to receiving an application request indicating a request to execute a job on one or more nodes 102 of the data center 130 or in response to a different signal or command.

Figure 6A:
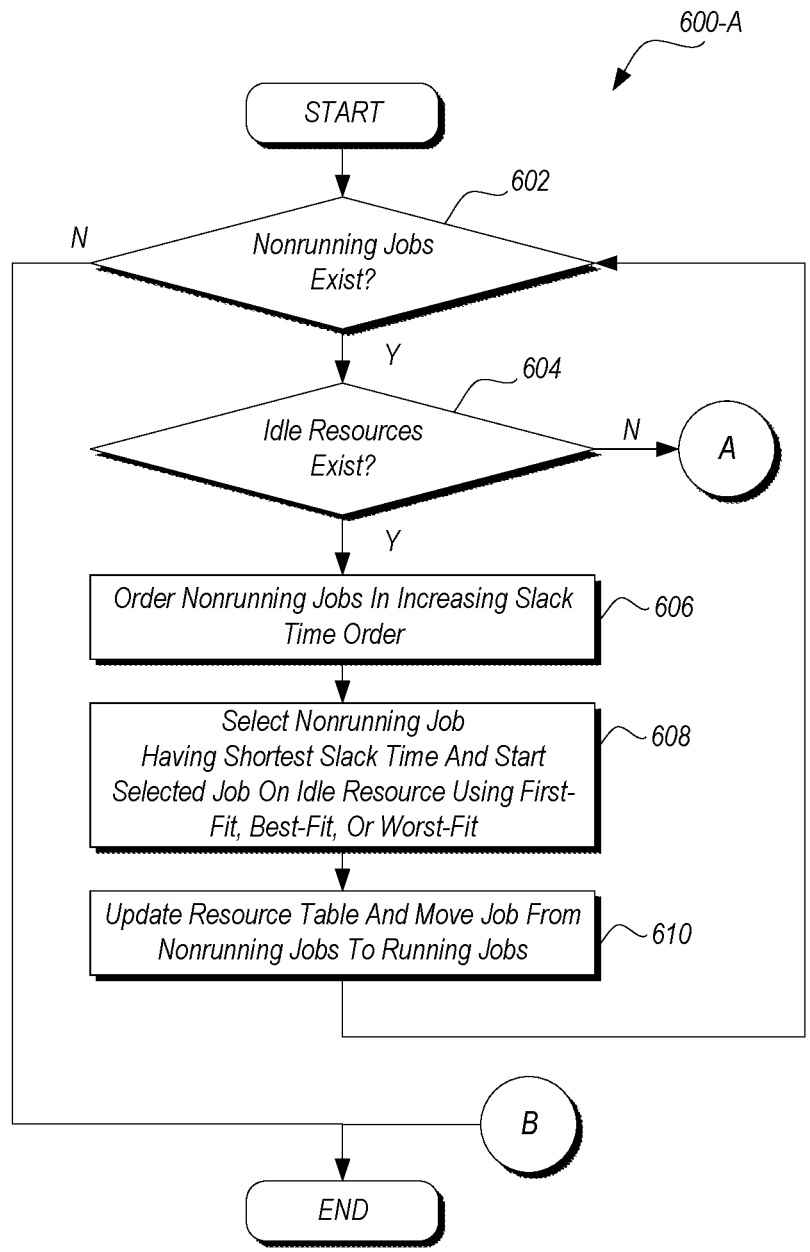
FIGS. 6A-6B are process flow diagram illustrating a method for scheduling nonrunning jobs.
Figure 6B:
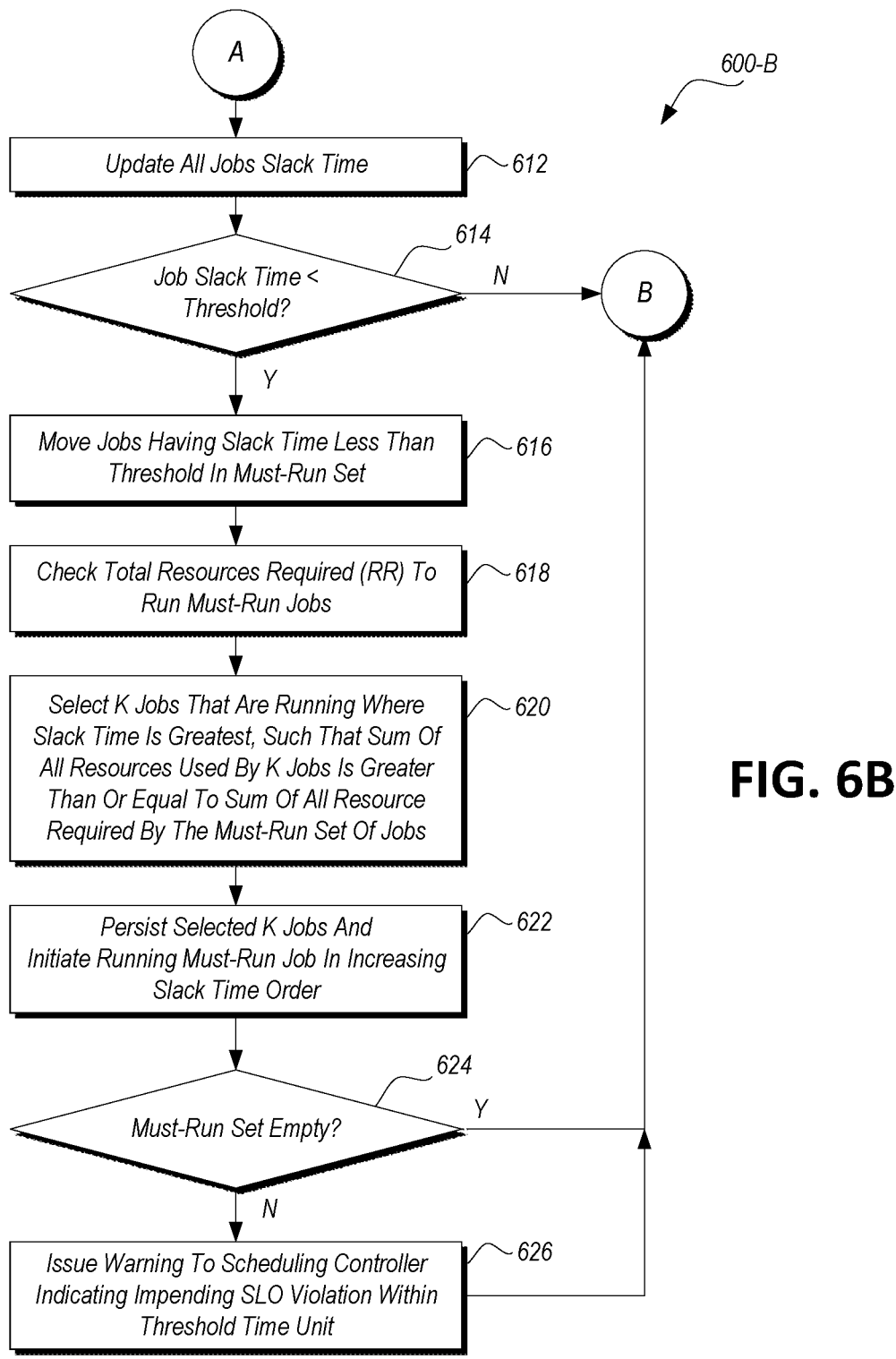

FIGS. 6A-6B illustrate an example process 600 (illustrated as a combination of a process 600-A and a process 600-B in FIG. 6A and FIG. 6B, respectively) for scheduling a job 108 on at least one resource (e.g., node 102) of the data center 130. The jobManager 306 may invoke one or more operations of the process 600 in response to receiving one or more notifications or commands from the scheduling controller 118, such as a notification that a job was added to the subCluster 106 managed by the jobManager 306. Additionally or alternatively, the jobManager 306 may perform one or more operations of the process 600 at predefined regular intervals to ensure that most valuable nonrunning jobs are transferred to otherwise idle resources and so on.

The process 600 begins at block 602 where the jobManager 306 determines whether any nonrunning jobs (i.e., jobs 108 in a nonrunning state) exist. The jobManager 306 may exit the process 600 in response to determining that no nonrunning jobs exist. In response to at least one nonrunning job being available, the jobManager 306 determines, at block 604, whether there exist any idle resources (e.g., nodes 102). In response to at least one idle resource being available, the jobManager 306, at block 606, sorts (or orders) the nonrunning jobs in an order of increasing slack time magnitude. The jobManager 306, at block 608, selects the nonrunning job having shortest (smallest magnitude) slack time and places them on nodes 102 with sufficient resources to run the job. In some instances, the jobManager 306 may select the nodes 102 using one or more of first-fit, best-fit, or worst-fit memory allocation approach. This has the effect of ensuring that the jobs that are closest to violating their SLO are given priority access to the nodes 102. If all nonrunning jobs are placed on nodes 102 then the jobManager 306 exits the process 600.

In response to determining that no idle resources exist, the jobManager 306, at block 612, updates the corresponding slack time of all jobs. The jobManager 306, at block 614, determines whether slack time of any nonrunning jobs is less than a threshold. If slack time of all nonrunning jobs is greater than a threshold, the jobManager 306 may exit the process 600.

In response to identifying at least one nonrunning job having slack time less than a threshold, the jobManager 306, at block 616, places the one or more identified nonrunning jobs in a Must-Run set. At block 618, the jobManager 306 determines total resources required (RR) necessary to run the Must-Run jobs. These jobs must be placed on nodes, yet there are no nodes at this time on which to place them. Accordingly, the jobManager 306 proceeds select a victim job set selection.

At block 620, the jobManager 306 identifies a set of running jobs such that the sum of the resources those jobs are using is greater than or equal to total resources required to run the Must-Run jobs. To avoid thrashing, the jobManager 306 selects the victim job set with the greatest slack time. For example, the jobManager 306 sorts the set of running jobs by decreasing slack time magnitude. Then, starting at the running job having the greatest slack time, and in decreasing slack time order, the jobManager 306 adds jobs to the victim job set until the total resources freed is greater than or equal to the resources required to run the MUST-RUN jobs.

The jobManager 306, at block 622, persists the jobs in the victim job set, and, as resources are freed, starts the jobs in the Must-Run on the vacated nodes in least slack time order.

The jobManager 306, at block 624, determines whether the Must-Run set of jobs is empty. The jobManager 306 exits the process 600 in response to determining that the Must-Run set of jobs is empty, i.e., all nonrunning jobs having slack time value less than a threshold are now running. If there are still jobs in the Must-Run set the jobManager 306, at block 626, issues an SLO violation warning to the scheduling controller 118 indicating that within threshold time units SLO violations will begin unless jobs complete before expected (freeing up resources), subSlices 312 are migrated off of the subCluster 106 (again freeing up resources), or more power is made available and there remain resources to turn on (providing more resources).

Figure 7A:
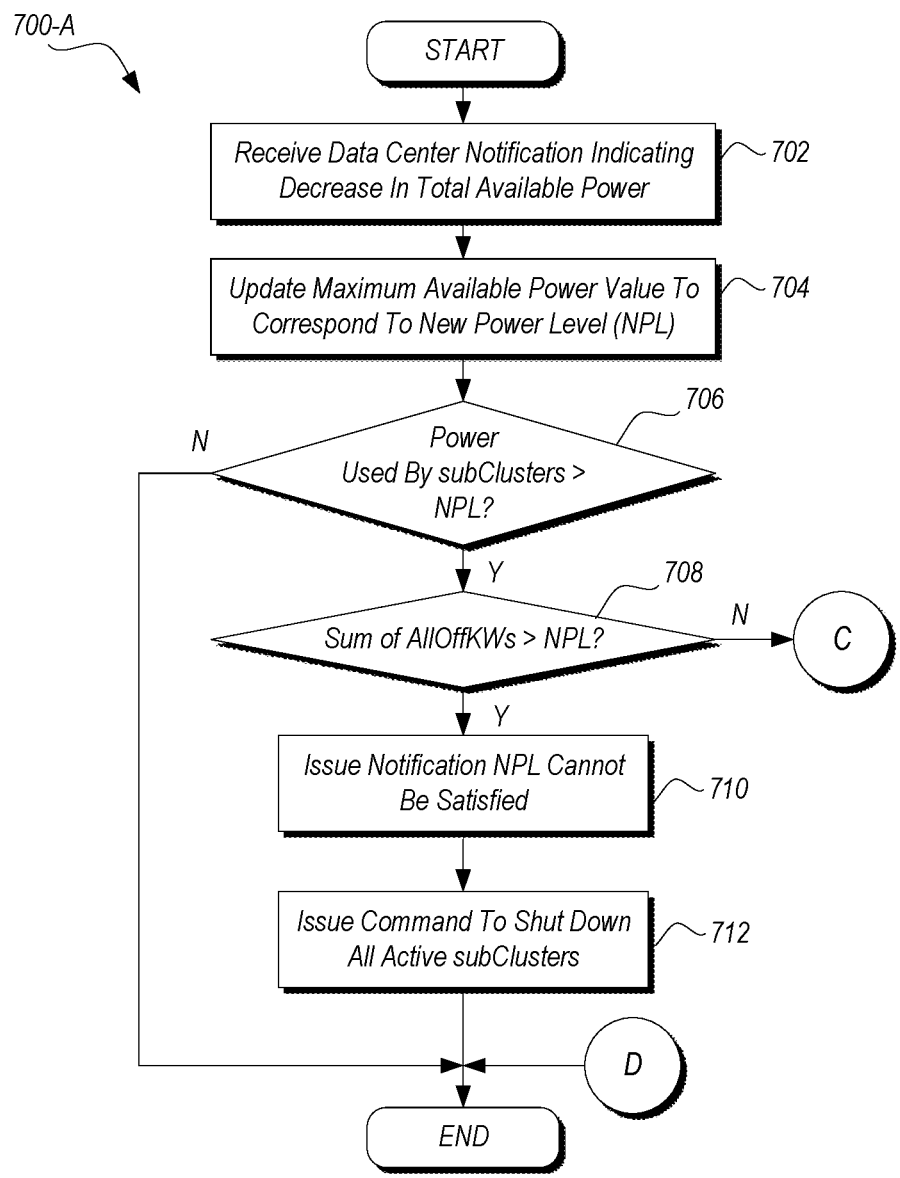
FIGS. 7A-7B are process flow diagrams illustrating a method for distributing data center resources in response to a decrease in available external power.
Figure 7B:
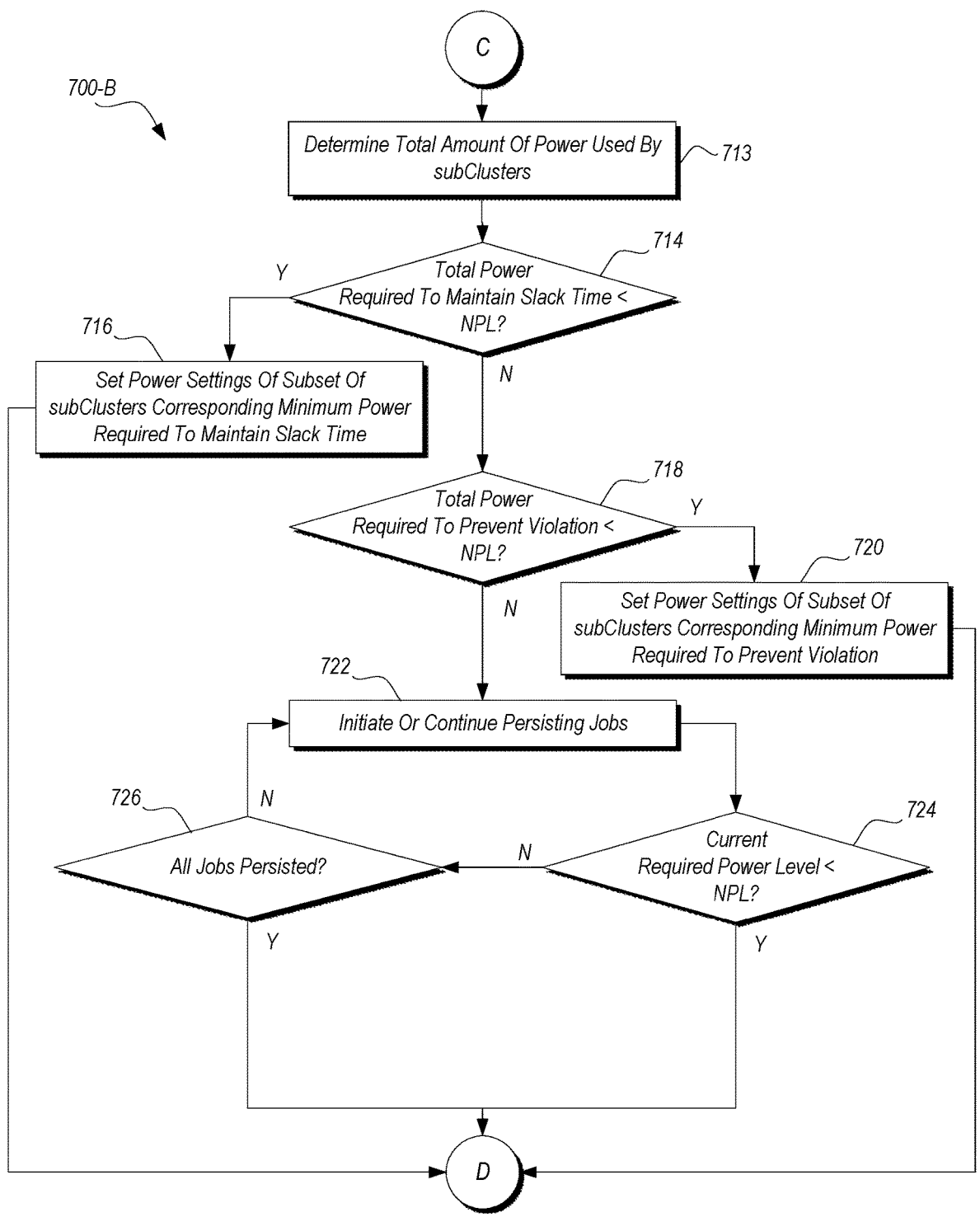

FIG. 7 illustrates an example process 700 for scheduling jobs and resources in view of a decrease in available power from the external power provider. The process 700 may begin at block 702 where the scheduling controller 118 receives a notification from an external power provider indicating how much total power is available for use. The signal indicating a decrease in power may be interpreted by the scheduling controller 118 as a new power level (NPL), where NPL is less than a current power level. The scheduling controller 118, at block 704, updates a maximum available power value to correspond to the NPL value. Upon receipt of a notification of a decrease in power availability to NPL the scheduling controller 118 determines whether a redistribution of power among the subClusters 106 of nodes is necessary and, if so, how to achieve the redistribution given a new power amount.

The scheduling controller 118, at block 706, determines whether the NPL can be accommodated without any changes to current power levels within the subClusters 106 of nodes. The scheduling controller 118 may exit the process 700 in response to total power used by subClusters 106 being less than or equal to the new power level.

The scheduling controller 118 determines that changes to power used by the subClusters 106 of nodes cannot be accommodated, in response to determining, at block 708, that the sum of AllOffKWs over all subClusters 106 is greater than NPL. In response to determining that power used by the subClusters 106 of nodes is greater than the new power level, the scheduling controller 118, at block 710, notifies the operator that the new power level cannot be accommodated and, at block 712, issues a command to shut down all active subClusters 106 of nodes. For example, the scheduling controller 118 may command the active subClusters 106 of nodes to shut down by instructing the active subClusters 106 of nodes to set their respective power levels to corresponding AllOffKW value. The scheduling controller 118 may then exit the process 700.

In response to determining that the sum of AllOffKWs over all subClusters 106 is less than NPL, the scheduling controller 118 determines that a reduction of power to at least a subset of the subClusters 106 of nodes is needed. At block 713, the scheduling controller 118 determines how much power is actually being used for each subCluster 106 and determines how much power to take from each subCluster 106 of nodes to accommodate the new power level. The scheduling controller 118 may determine a redistribution of power using a greedy algorithm approach. Of course, other algorithms and/or approaches may also be used.

The scheduling controller 118, at block 714, adds (or sums up) the MinPowerToMaintainSLO from each subCluster 106 and compares the sum to the NPL. If the sum of MinPowerToMaintainSLO is less than the NPL, the scheduling controller 118 determines that the new power setting requirement may be accommodated by setting a subset of the subClusters 106 power settings to their MinPowerToMaintainSLO values. The scheduling controller 118, at block 716, sets a subset of the subClusters 106 power settings to their MinPowerToMaintainSLO values.

If there is not enough power savings in the step above, the scheduling controller 118, at block 718, sums up MinPowerToPreventViolation and compares the sum to the NPL. If the sum is less than the NPL, the scheduling controller 118 selects a subset of the subClusters 106 to receive minimum power required to maintain slack time MinPowerToMaintainSLO and a subset of subClusters 106 to receive minimum power required to prevent SLO violation MinPowerToPreventViolation, such that the sum of the power provided each subCluster 106 is less than the new required power settings. The scheduling controller 118, at block 720, causes the power of a subset of subClusters to be set to minimum power required to prevent violation by sending the new max power settings to the subClusters 106. The scheduling controller 118 may then exit the process 700.

If the above steps will not achieve the required power savings, the scheduling controller 118 begins persisting one or more jobs, at block 722. Note that, in most instances, the scheduling controller 118 may be configured to perform the above steps in less than one second. The scheduling controller 118 may keep track of the energy savings achieved performing those steps. For example, following a command to persist one or more jobs, the scheduling controller 118, at block 724, determines whether current required power level is less than or equal to the NPL. In response to the current required power level being less than or equal to the NPL, the scheduling controller 118 exits the process 700. If current required power level is greater than NPL, the scheduling controller 118 determines, at block 726, whether all jobs have been persisted. If not all jobs have been persisted, the scheduling controller 118 returns to block 722 where it continues to persist jobs. Once all jobs have been persisted, the scheduling controller 118 thereby caused each subCluster 106 to reduce its power to the minimum power required to prevent violation MinPowerToPreventViolation. This causes current power CP to equal a sum of MinPowerToPreventViolation over all subClusters 106. The scheduling controller 118 determines that an amount of power that still needs to be eliminated corresponds to a difference between a current power CP and a new power level.

These next steps may cause jobs to miss their SLOs, which is undesirable. The scheduling controller 118 selects, according to a greedy algorithm as one example, the subset of subClusters 106 that will receive a power reduction by looking at the value per KW of the different subSlices 312 (e.g., an average of the job value/KW of the jobs in the subCluster 106). The scheduling controller 118 adds these subSlices 312, the subCluster 106 they are on, and the KW savings by persisting these jobs to a list. The scheduling controller 118 keeps a running sum. In response to determining that the target power savings have been achieved, the scheduling controller 118 sums up for each subCluster 106 the additional power to remove from that subCluster 106 of nodes and sends a reduce power command to each subCluster 106 of nodes.

In this manner, the scheduling controller 118 either meets the NPL or shuts down all of the nodes.

An example process for distributing data center resources in response to an increase in availability of power provided by an external power provider may be performed by the scheduling controller 118. For example, the scheduling controller 118 receives an increase power notification from the external power provider. Upon receipt of permission to increase power consumption the scheduling controller 118 determines how much power, if any, to distribute to each of the subClusters 106 under its control. The goal is to get all the jobs running, subject to the constraint of the new power level and available resources.

The scheduling controller 118 determines whether any resources (e.g., compute nodes 102) are in a minimal power state, i.e., in an off state or in an unpowered state. The scheduling controller 118 may exit the process if no resources in a minimal power state are available. In response to identifying at least one node 102 in a minimal power state, the scheduling controller 118 groups subSlices 312 into slack time intervals, e.g., 0 s of slack time to an hour of slack time, an hour+1 second to two hours, etc.

The scheduling controller 118 then iterates (or orders) over the intervals from in an order of increasing slack time interval magnitude as long as there are more resources to turn on and more power to turn them on.

For each interval, the scheduling controller 118 examines the subSlices S in that interval over all interval groups. The scheduling controller 118 determines whether any subSlices S in any of the slack time interval groups include nonrunning jobs. The scheduling controller 118 exits the process in response to determining that no nonrunning jobs are available. If at least one nonrunning job exists within at least one subSlice S of at least one interval group, the scheduling controller 118 orders identified nonrunning jobs in decreasing value per KW from the nonrunning job having greatest value per KW to the nonrunning job the least valuable per KW. The scheduling controller 118 checks whether there are resources that are in the minimal power state and can be used to satisfy the resource requirements of that subSlice S.

If the resources in the minimal power state are available, for each subCluster where those resources are located, the scheduling controller 118 calculates the additional power required to bring those resources online and into the power state required by the NOT RUNNING jobs in S to be placed there. The scheduling controller 118 keeps track for each subCluster how much additional power subCluster of nodes will receive and which jobs in S the subCluster will receive to run on those resources.

The scheduling controller 118 then partitions the subSlice S into subSlices such that the NOT RUNNING jobs of S that were assigned power are in a subSlice of jobs that will all be sent to the corresponding subCluster. Jobs in S that were RUNNING are placed into a new subSlice and left where they are. For any jobs in S that are left unassigned, the scheduling controller 118 places the unassigned jobs into a corresponding subSlice.

S has now been decomposed into subSlices 0 . . . N, where subSlice 0 has the jobs that were already RUNNING and which will be left on the cluster it was on, subSlice 1 has the jobs that will still not be RUNNING when the power level is raised, and the remaining subSlices contain jobs that are going to be migrated and subsequently run with the new power.

The scheduling controller 118 then informs the jobManagers 306 of the impacted subClusters 106 of the new partitioning, i.e., the subCluster that held S is notified of the repartitioning and instructed to migrate the new subSlices 2 . . . N to the appropriate subClusters.

Receipt of "subSlice transferred" from a subCluster 106. The location of the subSlice is updated in the metadata.

Receipt of an impending SLO violation for a subSlice 312 from a subCluster 106. There are three likely outcomes of receiving an impending SLO violation: some subSlice 312 is going to fail, the subSlice 312 with an impending violation will be partitioned and the subSlices 312 will be distributed to other subClusters 106, or power will be shifted between the subClusters 106 and the subSlice 312 will be partitioned and the subSlices 312 distributed to the subCluster 106 getting more power.

The scheduling controller 118, at block 904, determines whether there are any nodes in either idle and powered or in a minimal power state. at the site that can execute the jobs in the subSlice?

In response to determining that idle resources across all subClusters 106 able to run the jobs of subSlice 312 in sufficient quantity to match the Required Resources_To_Maintain_QoS of the subSlice 312, then the scheduling controller 118 partitions the subSlice 312 into subSlices proportionately to the idle resources in each subCluster 106 in a manner similar to that used when increasing power. The scheduling controller 118 then informs the jobManagers 306 of the impacted subClusters 106 of the new partitioning, i.e., the subCluster 106 that held S is notified of the repartitioning and instructed to migrate the new subSlices 2 . . . N to the appropriate subClusters.

If after the above steps all of the jobs in S have been distributed to other nodes, the process may then end.

If there are still jobs in S to be distributed, further attempt(s) may be made to schedule the jobs that were left behind and not running. This may cause subSlice value to become lower. First, the system may determine if there exists a lower value subSlice that uses the same resources. If so, the scheduling controller 118 starts at the lowest value subSlice, the victim, that uses the same resources as S. A determination may be made regarding the resources that victim subSlice uses in its subCluster by examining the resources consumed by jobs in the victim subSlice that are in the running state. The scheduling controller 118 creates a subSlice of S, S', that uses that determined amount of resource and send S' to the subCluster on which the victim is running. The scheduling controller 118 removes the jobs in S' from S. Due to the way jobManagers 306 handle their resources, this will have the effect of moving the victim subSlice jobs from being in a running state to being in a nonrunning state.

The scheduling controller 118 continues to find victim subSlices and distribute their resources to new subSlices of S, until either there are no more victims to be had, or all of S's jobs have been split off into subSlices and put on other resources.

If S's jobs have been split off and scheduled elsewhere, the process may then end. However, upon completion of the process, the lower value, victim, subSlices may experience a violation.

In the event that there are still jobs in S that need a new subCluster, the scheduling controller 118 checks whether there are idle nodes in a subCluster that cannot be used by S and there are powered off nodes of a type that S can utilize. If so, the scheduling controller 118 transfers the power used by the idle nodes from the subClusters that own them to the subClusters 106 with the unpowered nodes. In other words, the scheduling controller 118 reduces the power settings for some subClusters 106, and then increases the power settings in other subClusters 106. Reducing power to the subClusters with idle usable-by-S resources may cause them to turn off. Partitioning the remnants of S into subSlices that are sent to the subClusters that get more power may cause the off nodes that meet S's requirements to turn on.

For any jobs in S that have not been rescheduled, that subSlice of S will likely fail to meet its SLO. At that point the scheduling controller 118 may "lock" the subSlice, preventing the subSlice from getting any more resource, and/or may notify the user. The user may choose to accept a lower SLO (and therefore cost), or receive the penalty fee and have their remaining jobs in the failed subSlice of S terminated.

subClusters 106 receive commands from the scheduling controller 118 to start new jobs, migrate jobs (or a subSlice) to another subCluster, receive migrating jobs from another subCluster, increase maximum power, decrease maximum power, and pack the subCluster.

SubClusters 106 update the metadata M whenever jobs or subSlices complete, nodes are turned off, nodes are turned on, nodes fail, or nodes come online. Different embodiments of the PRSM functionality may partition the work in different ways, however, the same decision process and basic mechanisms to realize the decisions may be made.

Each jobManager 306 is responsible for managing its resources and scheduling jobs in its subSlices 312 onto its nodes in such a manner so as to avoid any job violating its SLO. If it is not possible to avoid SLO violation given the power available, nodes in operation, and subSlices 312 assigned to the subCluster 106, the subCluster 106 must notify the scheduling controller 118. Assuming, for example, that each jobManager 306 has two sets of jobs: a set of nonrunning jobs and a set of running jobs. In one example, each of the running jobs are executing on one or more nodes 102. As another example, nonrunning jobs are further partitioned into two sets: a first set comprising frozen jobs and a second set comprising persisted jobs. Frozen jobs are on a node and occupy memory, but they are not executing instructions. Running jobs may be frozen very rapidly (e.g., less than 100 ms). Frozen jobs may be thawed very rapidly (also <100 ms). Persisted jobs are not on a node. Rather a persisted job have been placed on stable storage and can be restarted later. It can take tens of seconds to persist a job.

After a predefined period, jobManagers 306 execute a scheduling cycle (FIG. 6) periodically, e.g., every 0.1 hours, or in response to arrival of a new job 108 or a new subSlice 312. When a new job 108 arrives, the new job 108 is placed into the set of nonrunning jobs. Likewise, all jobs in a newly arrived subSlice 312. The scheduling cycle is then invoked.

For the sake of clarity, operations of the process flow diagrams are described as being performed sequentially. However, the disclosure is not so limited. Indeed, any of the described processes, or portions of processes, may be performed concurrently, in a different sequence, or using some combination thereof.

Packing the subCluster

An example process flow for packing the subCluster 106 includes one or more operations, such that:

While there exists a node i in unpacked, in decreasing order of "fullness"

While there exists a job j∈candidate on a node k in unpacked AND i has sufficient resources to take j: (i) Add moving j to i to the migration plan; (ii) Remove j from candidate Move i to packed.

Remove all jobs p on i from candidate.

Execute the migration plan. When it is complete, the subCluster is packed.

The process for packing the subCluster 106 may rely on a greedy algorithm. The scheduling controller 118 may begin the packing process by placing all nodes in either the packed or unpacked set. Members of the packed set have no more resources usable by any other existing job. The goal when packing the subCluster 106 is to reduce node fragmentation in order to either shutdown nodes that are not needed to run the jobs in the subCluster 106 or to make room for jobs that need more of a resource than is currently available on any node.

Node fragmentation occurs when there are nodes that have idle resources such as cores, memory, or GPUs and there are nodes running jobs that could be migrated to the fragmented node with idle resources. This may occur when a job completes on a node leaving idle resources. Jobs are migrated to pack some of the nodes more fully and free up other nodes completely that can then be shut down or unpowered. Accordingly, packing may enable satisfying some job requests that would otherwise be unable to run.

The subCluster 106 may be packed by sending a "pack" command to the jobManager 306 or as an explicit step in executing other commands issued by the jobManager 306.

Members of the unpacked set have cores, GPUs, or other resources available. Accordingly, the scheduling controller 118 adds all running jobs on unpacked nodes to a set of candidate jobs.

By way of example, using a single resource case, the scheduling controller 118 examines the nodes in the unpacked set, starting with the most full node i to determine whether any jobs can migrate to the most full node i from the candidate set. In one example, to be migrated a job must be able to fit on the node i being examined by the scheduling controller 118. Select the job from the candidate set, the scheduling controller 118 may use one or more heuristics-based approaches, such as, but not limited to, a best-fit approach, a first-fit approach, and a worst-fit approach.

In response to identifying jobs that can be migrated to the most full node i being examined by the scheduling controller 118, the scheduling controller 118 places the migration, e.g., migrate j to i, into a migration plan and removes the job j from the candidate set. When there are no more jobs that may be moved to i, the scheduling controller 118 may move i from the unpacked to the packed set.

The process of packing the subCluster may be complete in response to at least one of there being no more jobs in candidate and there being no more nodes in unpacked. At this point, the scheduling controller 118 executes the migration plan and migrates all jobs j from the node all jobs j were onto the node assigned to those jobs j. The process may then end.

Reduce Power Event. In response to a power reduction event notification or request being received by the jobManager 306, the jobManager 306 may immediately reduce power to the specified level. The jobManager 306 may achieve this many ways. An example process for rapidly decreasing power by freezing jobs to meet the requirement includes shutting down idle nodes to meet the load reduction require (if possible), and then selectively persisting some frozen jobs, shutting down the nodes the persisted jobs were running on, and thawing frozen jobs to utilize the energy saved by shutting down nodes. In this way, a rapid power reduction may be achieved while ensuring that the most jobs are still running when the rapid power reduction has been achieved. Purely as an example, below explanation assumes there being one job per node. Of course, any number jobs may be running on a given node and may include migrating jobs between nodes, which may be achieved given the persist/restart capability for jobs.

If P>current power level (CP), set Max Power (MP) to P. Done.

Power Reduction Required (PRR)=CP–P. Idle Resource Power (IRP)=power used by idle resources Quick Freeze: (a) From running jobs, select J jobs in increasing value per KW to freeze to meet PRR. (b) Freeze all jobs in J. Now have rapidly met PRR.

Idle node shutdown (a) While there are more idle nodes and jobs in J (i) pick the job j in J with the highest value per KW (ii) while (P–CP)<j.powerRequired AND exists an idle node (1) Pick idle node n, (2) Shutdown n; (ii) If (P–CP)>j.powerRequired unfreeze j; (b) If J is empty, done.

Active node shutdown (a) While J non-empty and (CP+ power required for next j)<P; (i) Select j with highest value per KW; (ii) Select subset of jobs D with lowest value per KW such that the sum of power gained by turning off their nodes on which they are frozen is greater than the KW required to run j. (iii) If D exists (1) Persist all jobs in D and turn off their nodes. (2) Unfreeze j (iv) Else done.

As described above, FIGS. 7A and 7B illustrate an example process 700 (illustrated as a combination of process 700-A and process 700-B in FIGS. 7A and 7B, respectively) for achieving a rapid power reduction to meet a predefined new power level (NPL). The process may begin in response to the jobManager 306 receiving a notification, or otherwise determines or detects, a power reduction event. The scheduling controller 118 updates a maximum available power value to correspond to the new power level. The scheduling controller 118 determines whether an amount power used by subClusters is greater than the new power level, e.g., or a new maximum available power value. In an example, the scheduling controller 118 computes the amount of power used for the running jobs, i.e., power used by the nodes on which the jobs are running, and the idle nodes controlled by the subCluster job manager. The scheduling controller 118 may exit the process in response to determining that the amount of power used by the subClusters is less than the new power level.

In response to determining that the amount of power used by the subClusters is greater than the new power level, the scheduling controller 118 may determine a power reduction required (PRR) value, where the PRR value may correspond to a difference between an amount of power currently used by the subClusters (CP) and the new maximum load P.

The scheduling controller 118 may perform a "quick freeze" for predefined jobs to cause the power state of the nodes on which the jobs are running to change from CPU-ONLY or CPU-and-accelerator states to an idle state. The scheduling controller 118 selects the jobs to quick freeze by sorting the RUNNING jobs by dValue/dKW, and, in an order of increasing value per KW, freezes jobs while summing the energy consumption of each frozen job until the sum is greater than the PRR value. The jobs that have been frozen by the scheduling controller 118 may be in the FROZEN set. In one example, the scheduling controller 118 may freeze a job in an amount of time between 10-100 ms. The scheduling controller 118 may determine whether a sum of frozen jobs (a frozen energy) is greater than the PRR. The scheduling controller 118 may exit the process in response to determining that the PRR value has been met.

In response to detecting that every job has been frozen but the power consumption reduction has not yet been achieved, the scheduling controller 118 may shutdowns|unpowers one or more nodes to increase power consumption reduction when the one or more nodes transition from the idle state to the off or unpowered state. In one example, the scheduling controller 118 may transition one or more nodes powered via power distribution units that feature remote control nodes from an off state to an unpowered state to further increase power savings. As nodes are transitioned from idle to off/unpowered, the scheduling controller 118 may use the energy saved to restart frozen jobs.

The scheduling controller 118 restarts a subset of the frozen jobs by turning off and unpowering idle nodes, which, in some instances, may take up to several minutes. The scheduling controller 118 may run through the list of idle nodes, adding the idle nodes to the SHUTDOWN set of nodes, while continually summing the power gain that may be realizes by turning off and unpowering the idle nodes. The scheduling controller 118 may then compare the achieved power savings to the PRR value and repeat the process if the sum power savings have not yet met or exceeded the PRR value. In response to either achieving the desired power savings or determining that no further idles nodes have been The scheduling controller 118 issues a command to unpower and/or turn off each node in the SHUTDOWN set. Then, in response to detecting a shutdown of each node, the scheduling controller 118 continues to go through the FROZEN set in a decreasing value per KW and unfreeze the jobs and remove them from the FROZEN set. If there are no more jobs in the FROZEN set, the scheduling controller 118 may exit the process.

If there are still jobs in FROZEN set, the scheduling controller 118 enters the active node shutdown stage, i.e., the scheduling controller 118 initiates shutting off nodes that have jobs on them. The scheduling controller 118 may be unable to shutdown a node with FROZEN jobs without either blocking progress on the job until the node is restarted or destroying the job. In one example, before shutting down a node, the scheduling controller may migrate the jobs off of the node, either to another node or to stable storage, i.e., persist the job. Prior to being able to persist a FROZEN job, the scheduling controller 118 may need to thaw the job. The scheduling controller 118 may take tens of seconds (which is relatively slow) to persist a job.

Active node shutdown is an iterative process in which the scheduling controller 118 selects a job j having a highest value from FROZEN jobs, then selects the subset of jobs D having a lowest value per KW from FROZEN such that the sum of power gained by turning off their nodes on which the jobs in the subset D are frozen is greater than the KW required to run j. However, such subset D need not exist. If D exists, the scheduling controller 118 then persists all of the jobs in D and shutdown their nodes, moving the jobs from FROZEN to PERSISTED. When the nodes in D have shutdown, j is thawed and moved from FROZEN to RUNNING. The scheduling controller 118 may repeat the process until FROZEN is empty or no D exists to shut down. Note that in the limit all of the jobs will have been persisted and all of the nodes moved into their lowest power state, i.e., the subCluster is off. It will not be long before SLO violations begin.

Figure 8A:
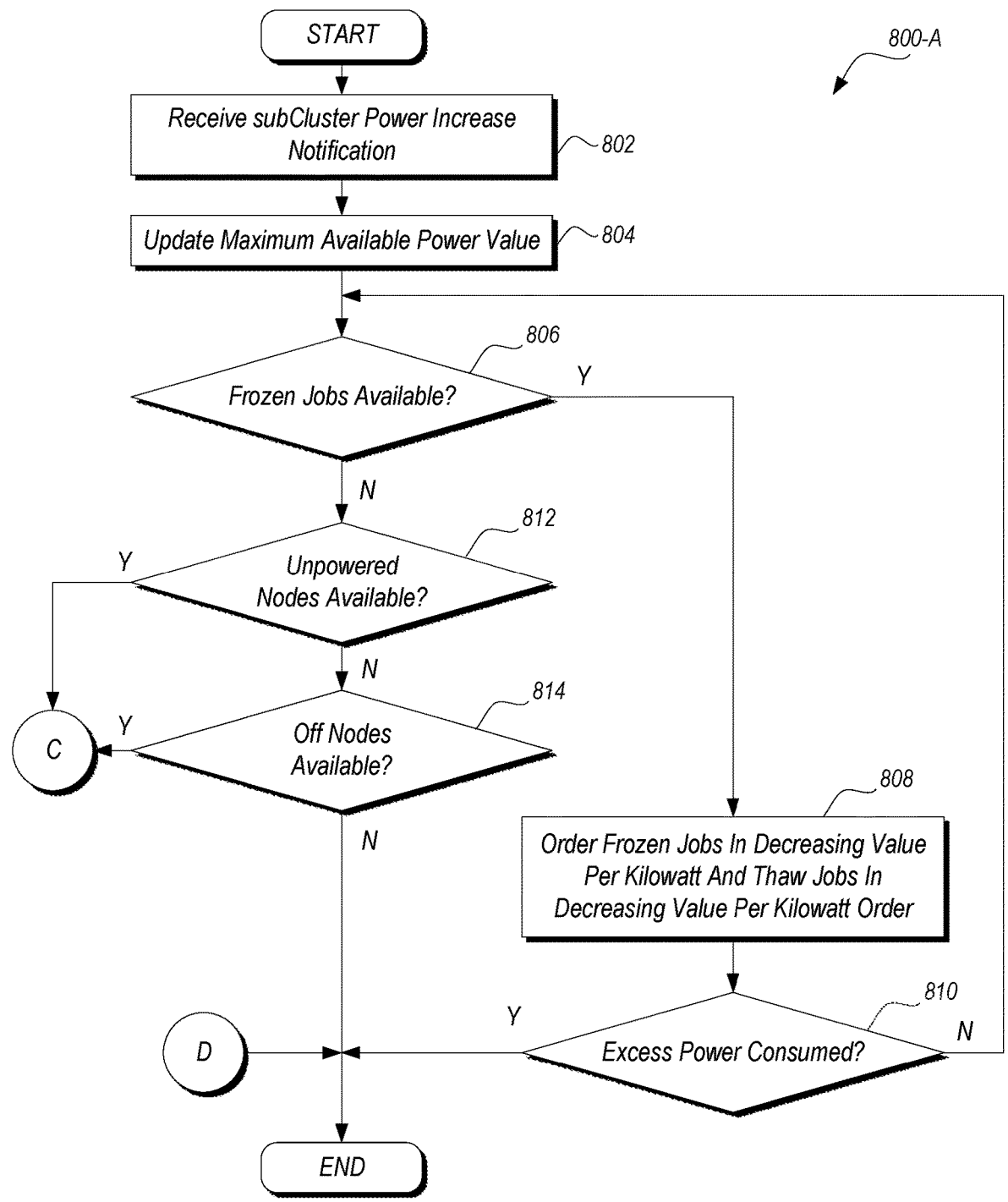
FIGS. 8A-8B are process flow diagrams illustrating a method for distributing power in response to an increase in available subCluster power.
Figure 8B:
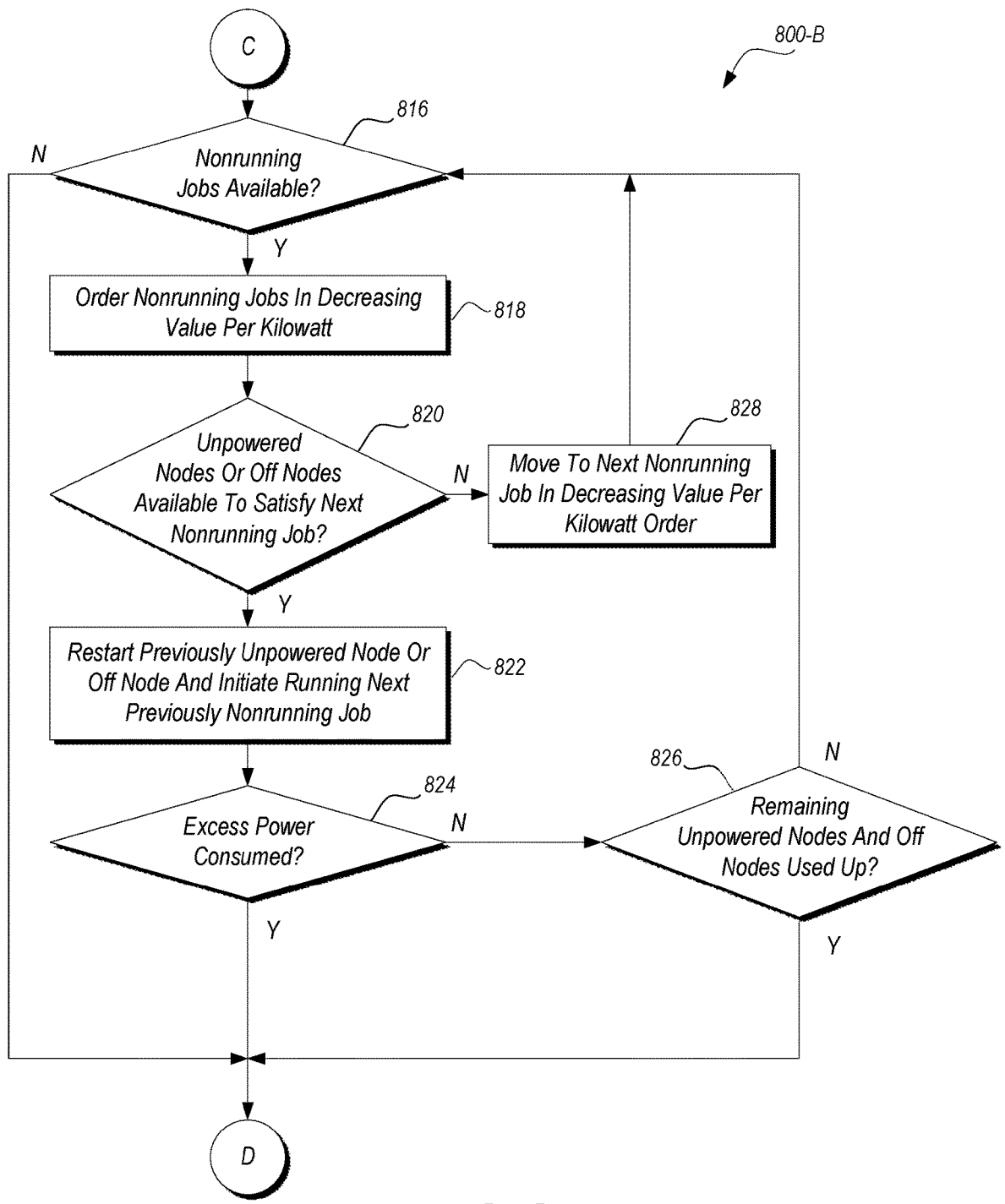

FIGS. 8A and 8B illustrate an example process 800 (illustrated as a combination of process 800-A and process 800-B in FIGS. 8A and 8B, respectively) for scheduling resources at a subCluster 106 level in response to an increased available power event. The process 800 may begin at block 802 where the jobManager 306 receives a notification, or otherwise determines or detects, that additional power has become available to a given subCluster 106 of nodes. At block 804, the jobManager 306 updates a maximum available power value to correspond to a new available power level.

At a high level, the jobManager 306 manages excess power availability by determining whether there are any frozen jobs and whether any resources (e.g., nodes) are in unpowered or off states. If no unpowered nodes or off nodes are available or if no frozen jobs are available, the jobManager 306 may exit the process 800.

If at least one unpowered node or at least one off node is available to be activated, the jobManager 306 determines which (where more than one) hardware resources to turn on. The jobManager 306 may be configured to turn on the hardware that will provide the most value for the given amount of extra power given the job mix of the subSlices that are not running (e.g., jobs that are in a nonrunning state). In other words, given the resources required by the subSlice MRR and the SLOs of those subSlices (including whether an SLO might be violated), the jobManager 306 is configured to turn that hardware that can execute most urgent and valuable jobs.

As a general matter, the jobManager 306 may handle excess power in different ways depending on whether the resources R of the subCluster 106 are homogeneous or heterogeneous. As one example, resources of a given subCluster 106 may be said to be homogeneous when all resources of the subCluster 106 have similar or identical computing configuration. As another example, resources of a given subCluster 106 may be said to be heterogeneous in response to at least one resource having different computing configuration and/or at least one of the resources of the subCluster 106 is unable to accommodate at least one MRR of at least one accepted job. The subCluster 106 having some combination of homogenous and heterogeneous resources is also contemplated, such that some resources may be identical to other resources of the subCluster 106, but different from still other resources of the subCluster 106.

If hardware of the data center is homogeneous, the jobManager 306 restarts off nodes (i.e., nodes in an off state) or unpowered nodes (i.e., nodes in an unpowered state) and as the nodes come back online, continues to perform scheduling operations.

The jobManager 306, at block 806, determines whether any frozen jobs (i.e., jobs that in a frozen state) are available to be thawed. In response to one or more frozen jobs being available, the jobManager 306, at block 808, orders the frozen jobs in an order of decreasing value per kilowatt, such that the order begins at a first frozen job having a first magnitude value per kilowatt, followed by a second frozen job having a second magnitude value per kilowatt, where the first magnitude value is greater than the second magnitude value and so on. The jobManager 306 then thaws the first frozen job having the first magnitude value per kilowatt. At block 810, the jobManager 306 determines whether excess available power has been consumed following thawing of the first frozen job. The jobManager 306 may exit the process 800 in response to determining that excess (or additional) available power has been consumed. If excess available power remains, the jobManager 306 returns to block 806 where the jobManager 306 determines whether any frozen jobs remain.

In response to determining that no more frozen jobs remain, the jobManager 306, at block 812, determines whether any unpowered nodes (i.e., nodes in an unpowered state) are available. In response to determining that none of the nodes are in an unpowered state, the jobManager 306, at block 814, determines whether any off nodes (i.e., nodes in an off state) are available. The jobManager 306 may exit the process 800 in response to determining that no off nodes are available. The process 800 may then end. In other examples, the process 800 may be repeated in response to a notification that additional power is available or in response to a different notification or command.

In response to detecting that at least one unpowered node or off node is available, the jobManager 306, at block 816, determines whether any nonrunning jobs (i.e., jobs in a nonrunning state) are available. The jobManager 306 may exit the process 800 in response to determining that no nonrunning jobs are available.

The jobManager 306 sorts the nonrunning jobs by value per KW and in decreasing value per KW order to determine whether an off/unpowered node is available than can be restarted and operated at a maximum power level without exceeding amount of additional available power.

If the available unpowered nodes or available off nodes are heterogeneous (e.g., have different corresponding computing capabilities that may or may not be able to accommodate one or more MRRs of the nonrunning jobs), the jobManager 306 determines, at block 820, whether any available unpowered nodes or available off nodes have computing capabilities that can accommodate at least one MRR of the most valuable nonrunning job. In response to identifying at least one available power node or at least one available off node having computing capabilities that can accommodate at least one MRR of the most valuable nonrunning job, the jobManager 306, at block 822, issues a command, or otherwise causes, restarting of the identified unpowered node or the identified off node. The jobManager 306, at block 824, determines whether excess available power has been used up. If more power remains available, the jobManager 306 determines, at block 826, whether all available unpowered nodes and all available off nodes have been used up (e.g., all nodes are in states other than an unpowered state or off state). The jobManager 306 may exit the process 800 if all available unpowered nodes and all available off nodes have been used up (i.e., none are available). In response to determining that at least one unpowered node or at least one off node remains, the jobManager 306 returns to block 816 where it determines whether any nonrunning jobs are available.

In response to identifying none of the available power nodes or available off nodes have computing capabilities that can accommodate at least one MRR of the most valuable nonrunning job, the jobManager 306, at block 828, proceeds to a next nonrunning job in the ordered nonrunning jobs. If a next nonrunning job is not available (e.g., if no nonrunning jobs remain), the jobManager 306 may exit the process 800.

Accept migrating subSlice. This is straight forward. For each job j in the new subSlice check the job state of j. It will be either persisting or persisted. Persisting simply means that the source subCluster has not yet fully persisted the job. If it is persisted, copy the state of the job from the source subCluster to local subCluster storage and unpack the state (if needed). As each job's persisted state is unpacked, place the job in NOT RUNNING.

If the job is still persisting, wait for the job state to transition from persisting to persisted, and then copy the job state, unpack the job state, and place the job in NOT RUNNING.

Prepare to migrate a subSlice to another subCluster. For each job in the subSlice, persist the job to stable storage. Later, when the other subSlice requests the job state, transfer the state. When the state of all jobs have been moved off of the subSlice, notify the scheduling controller that the subSlice is no longer resident.

Reinforcement Learning Embodiment of the Scheduler

Reinforcement learning (RL) is formulated under the Markov decision process (MDP) framework. RL is a promising alternative to learn efficient scheduling policies in data center settings. Unlike traditional model-driven approaches (heuristics based such as above), RL does not rely on heuristic assumptions or rules. RL directly fits a parametric model to learn the best control, based on its experience interacting with the complex systems.

The system of the present disclosure relies on techniques capable of quickly obtaining approximate solutions close to an optimum solution. An example function approximator is using Deep Neural Network (DNN) and the corresponding RL agent is Deep RL. A model-free reinforcement learning approach may be applied. In contrast to offline planning algorithms aimed towards finding optimal solutions in a model-based manner, RL allows for employing independent learning agents leading to a decentralized scheduler.

Figure 9:
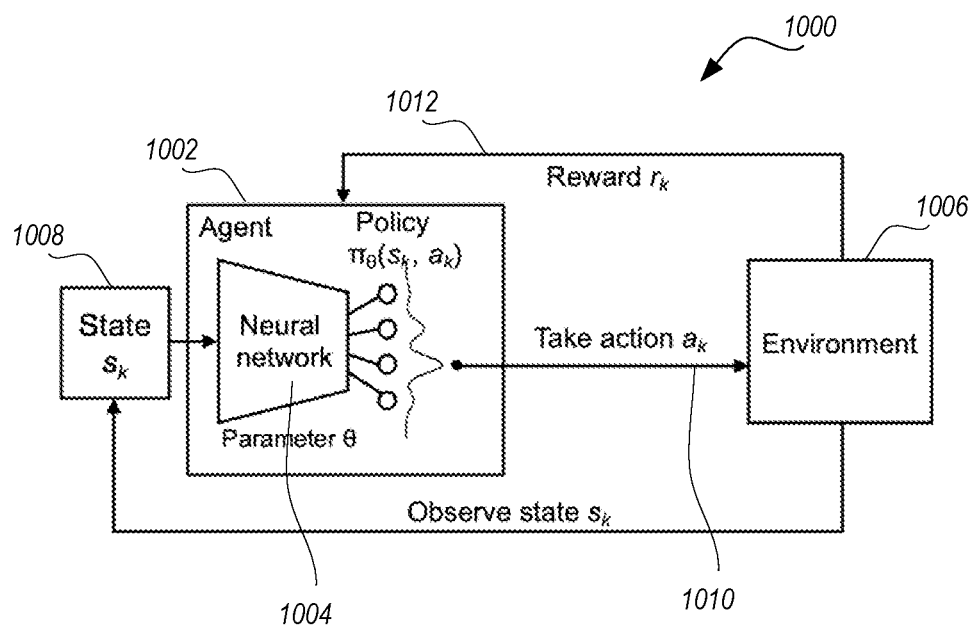
FIG. 9 is a block diagram illustrating a system for executing an application using reinforcement learning in a deep neural network (DNN).

A general setting 1000 shown in FIG. 9 represents an agent 1002 with Deep Neural Network (DNN) 1004 as a policy network that interacts with an environment 1006. At each time t, the agent 1002 observes system state s (t) 1008 and the agent 1002, based on the observed system state 1008, chooses an action a(t) 1010. For the chosen action 1010, the state of the environment transitions from s(t) to s(t+1), the agent 1002 receives a reward r(t) 1012 for that action 1010. The state transitions and corresponding rewards are stochastic and have the Markov property—the state transition 1008 probabilities and rewards 1012 depend on the state of the environment s(t) and the action a(t) taken by the agent.

In reference to FIGS. 2A-2B, the state Sk 1008 is held in the metadata M 210 of the PRSM 208; the agent 1002 corresponds to the scheduling controller 118; and the actions ak 1010 are executed by the scheduling controller 118.

The agent 1002 can control only its actions 1010, not the reward 1012 after taking action 1010. During training, the agent 1002 interacts with the metadata M 210 and observes quantities of the system for various actions 1010. The agent's 1002 (or the scheduling controller's 118) goal is to maximize the expected discounted reward given by Equation (2), such that $$E[\Sigma \infty 0 \gamma t\ rt],\qquad(2)$$

where $\gamma \in (0, 1]$ is indicative of a factor discounting future rewards.

The discounting factor specifies how important future rewards are with respect to the current state. If the reward r occurs n steps in the future from the present state, then reward is multiplied by γn to describe its importance to the present state.

The act of selecting an action at each state is called 'policy' and is denoted as π. The agent selects next actions based on a policy (π). Policy is a probability distribution over actions π:π(s,a)→[0, 1]. Thus π(s,a) is the probability that an action a is taken in states. There are many possible (s,a) pairs, exponential in our case. Therefore, it may not be practical to store the policy in vector format. In some examples, the system of the present disclosure may use function approximators. A function approximator has considerably fewer number of parameters, θ represented as π?(s,a). The idea is by approximating the policy; the agent would take similar actions for similar or close-by states.

Deep Neural Networks (DNNs) have been used successfully as function approximators to solve large-scale RL tasks. An additional advantage of DNNs is that they do not need hand-crafted features.

The class of RL algorithms that learn by performing gradient-descent on the policy parameters is the focus here. The policy-gradient method gives the directions the parameters should be adjusted in order to improve a given policy's performance. The process of training RL agents is just optimizing the objective function where the objective is to get maximum expected cumulative discounted reward, as given by Equation (5), by taking the gradient of objective function of Equation (3), such that:

$$\nabla \theta E \pi \theta[\Sigma t 0 r t] => \Sigma t 0[\nabla \theta \log \pi \theta(s,a) Q \pi \theta(s,a)] \quad (3)$$

where $Q\pi\theta(s,a)$ is indicative of expected cumulative discounted reward from choosing action a in state s and, subsequently, following policy $\pi\theta$. Thus, the gradient may be estimated using policy gradient methods, i.e., by observing the trajectories of executions that are obtained after following a policy. The agent samples multiple trajectories and uses the cumulative discounted reward, v(t), as an unbiased estimate of $Q\pi\theta(s(t),a(t))$. The agent then iteratively updates the policy parameters in the direction of the gradient.

The environment or the state will be encoded in image format (available resources, duration of availability, jobs waiting and running etc.). The policy represented as a neural network, also referred to as a policy network, generates, based on a collection of images, a probability distribution over possible actions. The policy network trained in episodes where, in each episode, a fixed number of jobs arrive and are scheduled based on the policy. During training, when all jobs finish executing, the episode terminates.

It is important to consider multiple examples of job arrival sequences during training so that the network generalizes well. During training, the state, action, and reward information for all timesteps of each episode is recorded. These values are used to compute the discounted cumulative reward for each timestep (t) for every episode. Where training leads to a variance being greater than a threshold, variance may be reduced by subtracting a baseline value from the returned rewards.

In a single-agent setting, e.g., PRSM 106, the whole state space is considered as one Markov Decision Process (MDP). A single-agent perceives the whole system as one MDP and solves the whole MDP.

More concretely, the scheduler (agent) comprises a state space S and an action space A, as shown in Equations (4) and (5), such that:

State space S={Jobs<requirements,SLO>,Available
    Resources,Predicted future availability of
    resources}        (4)

and

Action space $A$={Submit(where),Resume,Suspend,
    Migrate(to where),Terminate}.        (5)

The reward function is a linear combination of the value of actions and costs at a given state. For instance, the agent gets a small positive reward every time a job is scheduled. If the agent decides to suspend a job, then it incurs a small negative cost and resuming a job will have a small positive reward. Similarly, if a job is migrated then the agent incurs a small negative cost. Finally, when a job finishes while meeting the SLO, the agent receives a substantially large positive reward proportional to the job's value. For example, as shown in Equation (6):

Reward=Σschedule_job+suspend_job+resume_job+
    migrate_job+finished_job        (6)

The rewards can be adjusted based on whether the action is positive {Run, Resume, Finish, Thaw} or negative {Freeze, Persist, Terminate, Migrate}. The actions are positive or negative based on whether or not an action contributes towards meeting the objective function, i.e., meeting user SLOs. Since the actions {Run, Resume, Finish, Thaw} have a positive contribution towards meeting the objective function, they are terms as positive actions. Similarly, the actions {Freeze, Persist, Terminate, Migrate} may lead to violating user SLOs or increase the average job completion time (TTC), they are termed negative actions. Job migration action can be either positive or negative based on whether the job is migrated to better resource (which may lead to faster completion time (TTC) or closer to data source for faster access to data) or job is migrated because of power failure in current location in which case the migration time may increase an amount of time to job completion (TTC). Positive actions accrue positive rewards and negative actions accrue negative rewards, the amount of reward can vary based on the type of action. For example, migration costs may be higher for a job if job migration takes longer than just suspending/resuming the job in the same location.

The agent learns policies to maximize rewards over time. The look-ahead policies make decisions by explicitly optimizing over a fixed horizon by combining some approximation of future information, with some approximation of future actions. The agent can control only its actions and not the rewards, it does not have a priori knowledge of which state the environment would transition and rewards after a specific action.

In a dynamic power variability environment, the look ahead policies will help optimize our objective functions by placing jobs in order to maximize SLOs and revenue. To address the inherent dynamism in this setup, the scheduler should make scheduling decisions considering the different SLO levels to ensure that high priority jobs are never/rarely terminated even if it means keeping a few machines running in the data center during high demand/low power availability until the high priority jobs finish (maximizing SLOs).

The advantages of a central agent are: 1) The agent has a global view of the state space and hence can optimize the schedule to maximize the objective function, and 2) There is no communication overhead in terms of coordinating with other agents. The disadvantage is that the state space can become combinatorial and learning will take a long time to converge to a near-optimal policy.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method comprising:
   by a scheduling controller,
      receiving from a user a request for an application to be executed by a computing system associated with a data center, wherein the application includes a plurality of tasks, and wherein the request includes an estimated execution time corresponding to an estimated amount of real-world time that the tasks will be actively running on the computing system to fully execute the application;
      receiving from the user a service level objective indicating a target percentage of a total amount of real-world time that the tasks will be actively running on the computing system;
      generating, in response to determining that a job corresponding to the tasks of the application to be executed can be completed according to the service level objective and the estimated execution time, a notification indicating acceptance of the job;

scheduling the job corresponding to the tasks of the application to be executed by the computing system, wherein scheduling is based on a slack time corresponding to the job, the slack time comprising a remaining real-world time until the job violates the service level objective, the slack time determined based on the service level objective, the estimated execution time, and a real-world time consumed by the job; and notifying, in response to the scheduled job being fully executed, the user that the application execution completed.

2. The method of claim 1, wherein the target percentage is a numerical value between zero and one.

3. The method of claim 1, wherein a time-to-complete is determined based on a quotient of the estimated execution time and the target percentage.

4. The method of claim 1, wherein the total amount of real-world time is a period of time beginning in response to the request being accepted and ending in response to the fully-executed application being delivered to the user.

5. The method of claim 1, wherein a value of the service level objective is selected according to a first cost to the user in response to selection of a first numerical value for the target percentage is greater than a second cost to the user in response to selection of a second numerical value for the target percentage, wherein the first numerical value is greater than the second numerical value.

6. The method of claim 5, wherein the first cost and the second cost correspond to monetary costs.

7. The method of claim 5, wherein the first cost and the second cost corresponds to allocation units provided to the user, and wherein the user has a limited number of the allocation units.

8. The method of claim 1, wherein scheduling the job includes:

in response to a change in available power from a first level to a second level, suspending execution of the job, wherein the level is less than the level;

shutting down an idle node of the data center in response to suspending execution of the job, wherein shutting down the idle node requires a larger amount of real-world time than suspending execution of the job; and restoring execution of the job in response to shutting down the idle node, wherein restoring occurs while the available power is at the second level.

9. A system comprising:

a computing system of a data center; and a scheduling controller communicatively connected to the computing system, the controller being configured to:

receive a request for an application to be executed by the computing system, wherein the application includes a plurality of tasks, and wherein the request includes an estimated execution time corresponding to an estimated amount of real-world time that the tasks will be actively running on the computing system to fully execute the application;

receive a service level objective indicating a target percentage of a total amount of real-world time that the tasks will be actively running on the computing system;

generate, in response to determining that a job corresponding to the tasks of the application to be executed can be completed according to the service level objective and the estimated execution time, a notification indicating acceptance of the job;

schedule, based on a slack time corresponding to the job, the job corresponding to the tasks of the application to be executed by the computing system, the slack time comprising a remaining real-world time until the job violates the service level objective, the slack time determined based on the service level objective, the estimated execution time, and a real-world time consumed by the job; and notify, in response to the scheduled job being fully executed, the user that the application execution has completed.

10. The system of claim 9, wherein the target percentage is a numerical value between zero and one.

11. The system of claim 9, wherein a time-to-complete is determined based on a quotient of the estimated execution time and the target percentage.

12. The system of claim 9, wherein the total amount of real-world time is a period of time beginning in response to the request being accepted and ending in response to the fully-executed application being delivered to the user.

13. The system of claim 9, wherein a value of the service level objective is selected according to a first cost to the user in response to selection of a first numerical value for the target percentage is greater than a second cost to the user in response to selection of a second numerical value for the target percentage, wherein the first numerical value is greater than the second numerical value.

14. The system of claim 9, wherein to schedule the job includes:

in response to a change in available power from a first level to a second level, suspending execution of the job, wherein the second level is less than the first level;

shutting down an idle node of the data center in response to suspending execution of the job, wherein shutting down the idle node requires a larger amount of real-world time than suspending execution of the job; and restoring execution of the job in response to shutting down the idle node, wherein restoring occurs while the available power is at the second level.

15. The system of claim 9, wherein the scheduling controller is further configured to migrate execution of a first class of applications from a first plurality of computing systems in the data center to a second plurality of computing systems in a second data center in response to a determination that the availability of the power that is accessible to the data center has decreased below a threshold level, wherein the application is associated with the first class of applications.

16. The system of claim 9, wherein the scheduling controller operates based on a centralized heuristic algorithm.

17. The system of claim 9, wherein the scheduling controller operates based on one of a distributed heuristic algorithm or a centralized machine-learning algorithm.

\* \* \* \* \*